(12) United States Patent
Nagata et al.

(10) Patent No.: US 7,821,526 B2
(45) Date of Patent: Oct. 26, 2010

(54) IMAGE FORMING APPARATUS

(75) Inventors: Naohisa Nagata, Moriya (JP); Ichiro Sasaki, Toride (JP); Akinobu Nishikata, Kashiwa (JP); Satoru Yamamoto, Abiko (JP); Hiroshi Matsumoto, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 841 days.

(21) Appl. No.: 11/745,017

(22) Filed: May 7, 2007

(65) Prior Publication Data

US 2007/0268357 A1    Nov. 22, 2007

(30) Foreign Application Priority Data

May 16, 2006  (JP) ............................. 2006-136418
Mar. 28, 2007  (JP) ............................. 2007-084688

(51) Int. Cl.
*G03G 15/04* (2006.01)

(52) U.S. Cl. ..................... 347/131; 347/132; 347/243

(58) Field of Classification Search ............ 347/131, 347/132, 133, 129, 243, 251, 252, 253, 254; 358/1.2
See application file for complete search history.

(56) References Cited

U.S. PATENT DOCUMENTS 6,559,875 B2 * 5/2003 Okano et al. ................ 347/131
2005/0200689 A1  9/2005 Shinohara et al.

FOREIGN PATENT DOCUMENTS

| JP | 2002-014507 A | 1/2002 |
| JP | 2002-354234 A | 12/2002 |
| JP | 2005-292760 A | 10/2005 |

* cited by examiner

*Primary Examiner*—Juanita D Stephens
(74) *Attorney, Agent, or Firm*—Canon U.S.A., Inc., IP Division

(57) ABSTRACT

An image forming apparatus is configured, in performing changing of a rotation speed of a scanner motor and forming of an image density adjustment patch in the same page interval, to change the rotation speed of the scanner motor before forming the image density adjustment patch.

12 Claims, 20 Drawing Sheets

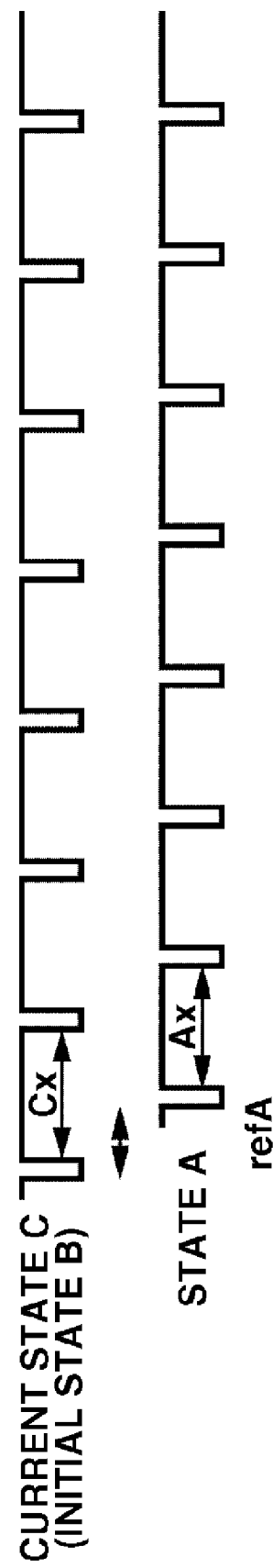

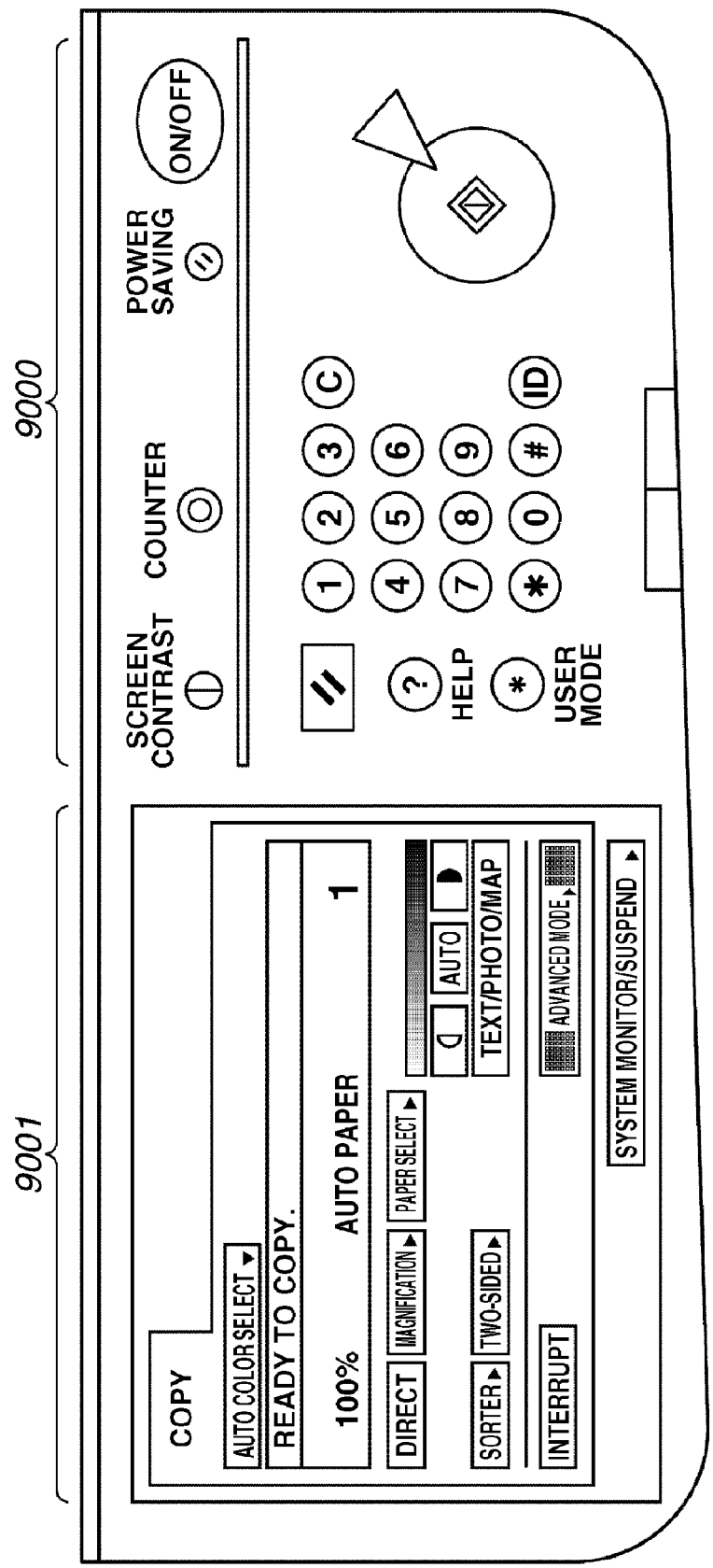

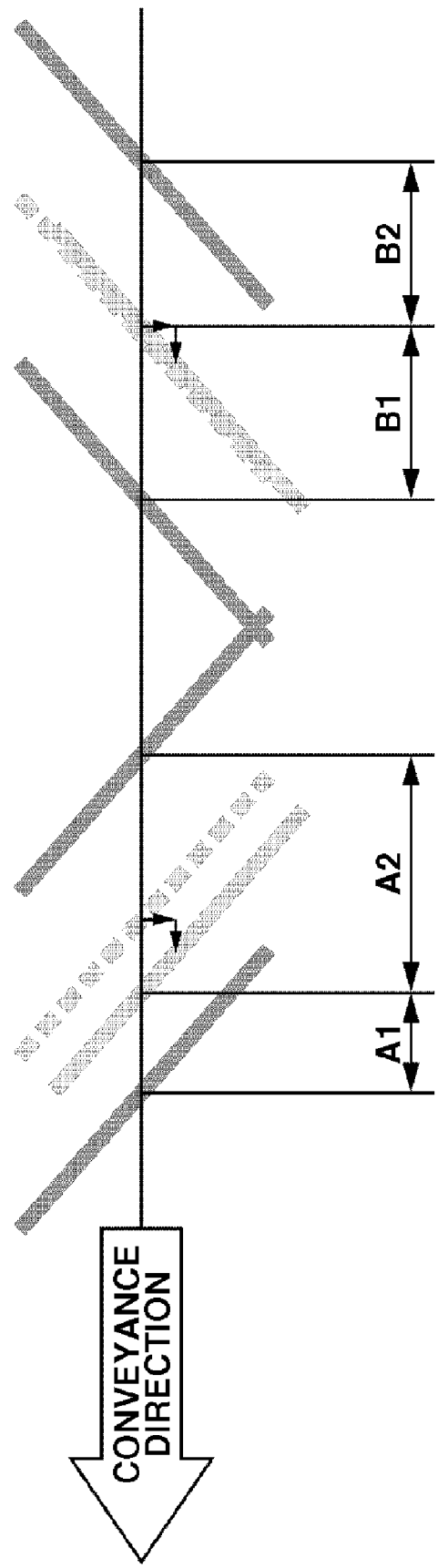

IMAGE FORMING APPARATUS

BACKGROUND OF THE INVENTION

1. Field of the Invention

The present invention relates to an image forming apparatus capable of variably controlling the rotation speed of a rotating polygonal mirror for deflecting a laser beam.

2. Description of the Related Art

In recent years, image forming apparatuses, such as copying machines and printers, capable of forming images on a plurality of types of sheets at high speed, with high image quality, and with high accuracy have been in demand. In particular, to increase the speed of forming color images, a plurality of image forming units corresponding to four colors of yellow, magenta, cyan, and black may be utilized by a color image forming apparatus to serially form color images.

Such an image forming apparatus uses a laser beam (a beam generated by a beam generation unit) and a drive motor that drives a rotating polygonal mirror (a scanning unit) for deflecting the laser beam (hereinafter referred to as a "scanner motor"). In order to allow such an image forming apparatus to operate at high speed, various methods for increasing the speed of forming images have been proposed. In addition, a method has been proposed in which an interval between images serially formed (a page interval, namely, an interval between print sheets) is controlled to be small (not to make a large interval between images).

Meanwhile, in order to form a high quality image, it is desirable to accurately align a position of an image formed in a print sheet. Furthermore, it is desirable to reduce color drift occurring at the time of superposing images of a plurality of colors and to reduce density variation of an image formed on a sheet.

Characteristics or attributes of print sheets to be used for forming images thereon differ depending on use applications (one-sided printing and two-sided printing), use conditions and environments (humidity and temperature), sheet thickness and hardness, and sheet manufacturers. Accordingly, the amount of thermal contraction of a print sheet that has passed through a fixing device to heat and fix an image formed on the print sheet differs with each type of print sheet.

Thus, it is desirable to accurately align a position at which an image is formed on a print sheet according to the amount of thermal contraction of the print sheet. In this regard, in a conventional method, the magnification of an image (the size of an image) is appropriately changed according to characteristics and attributes of print sheets. Japanese Patent Application Laid-Open No. 2002-354234 discusses a method for changing the magnification of an image by controlling the rotation speed of a scanner motor to correct shifting of a position at which an image is formed.

The temperature of a photosensitive drum (photosensitive member) for each color and an intermediate transfer belt (intermediate transfer member) varies during image forming. In addition, after a continuous use thereof for a long period of time, a photosensitive drum and an intermediate transfer belt can be deteriorated. These environmental matters need to be considered or addressed in order to form a high quality image. Moreover, shifting of an image forming position occurring due to variation in environmental matters needs to be reduced to be sufficiently small. In order to reduce shifting of an image forming position, an ordinary image forming apparatus forms a position detection mark (registration patch) to determine the amount of shifting of an image forming position by reading the formed position detection mark with a sensor, and to correct a timing for writing a latent image during subsequent image forming.

In addition, in a conventional method, an image density adjustment mark (density patch) is formed in order to maintain the density of images formed during serial printing to be constant, and the density of an image to be formed is corrected based on the density of the image density adjustment mark read with a sensor, so as to reduce density variation occurring due to environmental variations.

In the method discussed in Japanese Patent Application Laid-Open No. 2002-354234, the rotation speed of a scanner motor is changed at a page interval (interval between print sheets) according to the image magnification to form an image page by page. In this method, image forming cannot be started during changing of the rotation speed of the scanner motor (during switching of the rotation speed). Accordingly, forming of the next image cannot be started until the changing of the rotation speed is completed (until the rotation speed is completely switched). In this regard, several hundreds of milliseconds, for example, is required for a time period from the start of changing of the rotation speed to the end thereof depending on the type of a scanner motor used in image forming.

Even in a case where the rotation speed of a scanner motor is not changed, in forming various patches at a page interval, if the edge portion of a print sheet and a patch are positioned too close to each other, the edge portion of a print sheet can be stained due to scattering of a developer (toner) occurring during forming of a patch. Accordingly, it is necessary to form a patch image (pattern image) with a predetermined interval set between print sheets.

Furthermore, in a case where changing of the rotation speed of a scanner motor and forming of a registration patch or density patch are performed at the same page interval, it is necessary to form the registration patch or density patch during a time period in which changing of the rotation speed of the scanner motor is not being performed. Accordingly, a page interval needs to be further enlarged. Thus, productivity is adversely lowered in forming a high quality image.

SUMMARY OF THE INVENTION

According to an aspect of the present invention, an image forming apparatus includes an image carrier, a scanning unit including a rotating polygonal mirror and configured to perform beam scanning using the rotating polygonal mirror to form an image on the image carrier, a control unit configured to change a rotation speed of the rotating polygonal mirror of the scanning unit to change a magnification of an image to be formed on the image carrier, a carrying member, and an adjustment unit configured to form a patch image in an area on the carrying member between a first area to which an image formed at a first scanning speed is transferred and a second area to which an image formed at a second scanning speed different from the first scanning speed is transferred and to perform an operation for adjusting an image to be formed on the image carrier based on a result of detection of the formed patch image, wherein the adjustment unit is configured to form the patch image after the control unit changes the rotation speed of the rotating polygonal mirror from the first scanning speed to the second scanning speed.

Further features and aspects of the present invention will become apparent from the following detailed description of exemplary embodiments with reference to the attached drawings.

BRIEF DESCRIPTION OF THE DRAWINGS

The accompanying drawings, which are incorporates in and constitute a part of the specification, illustrate exemplary embodiments, features, and aspects of the invention and, together with the description, serve to explain the principle of the invention.

FIG. 7 illustrates period signals applied to the scanner motor according to an exemplary embodiment of the present invention.

FIGS. 9A, 9B, and 9C each illustrate an exemplary configuration of an operation unit according to an exemplary embodiment of the present invention.

FIG. 11 is a flow chart illustrating processing for detecting color drift according to an exemplary embodiment of the present invention.

DETAILED DESCRIPTION OF THE EMBODIMENTS

Various exemplary embodiments, features and aspects of the present invention will now herein be described in detail with reference to the drawings. It is be noted that the relative arrangement of the components, the numerical expressions, and numerical values set forth in these embodiments are not intended to limit the scope of the present invention unless it is specifically stated otherwise.

Figure 2:
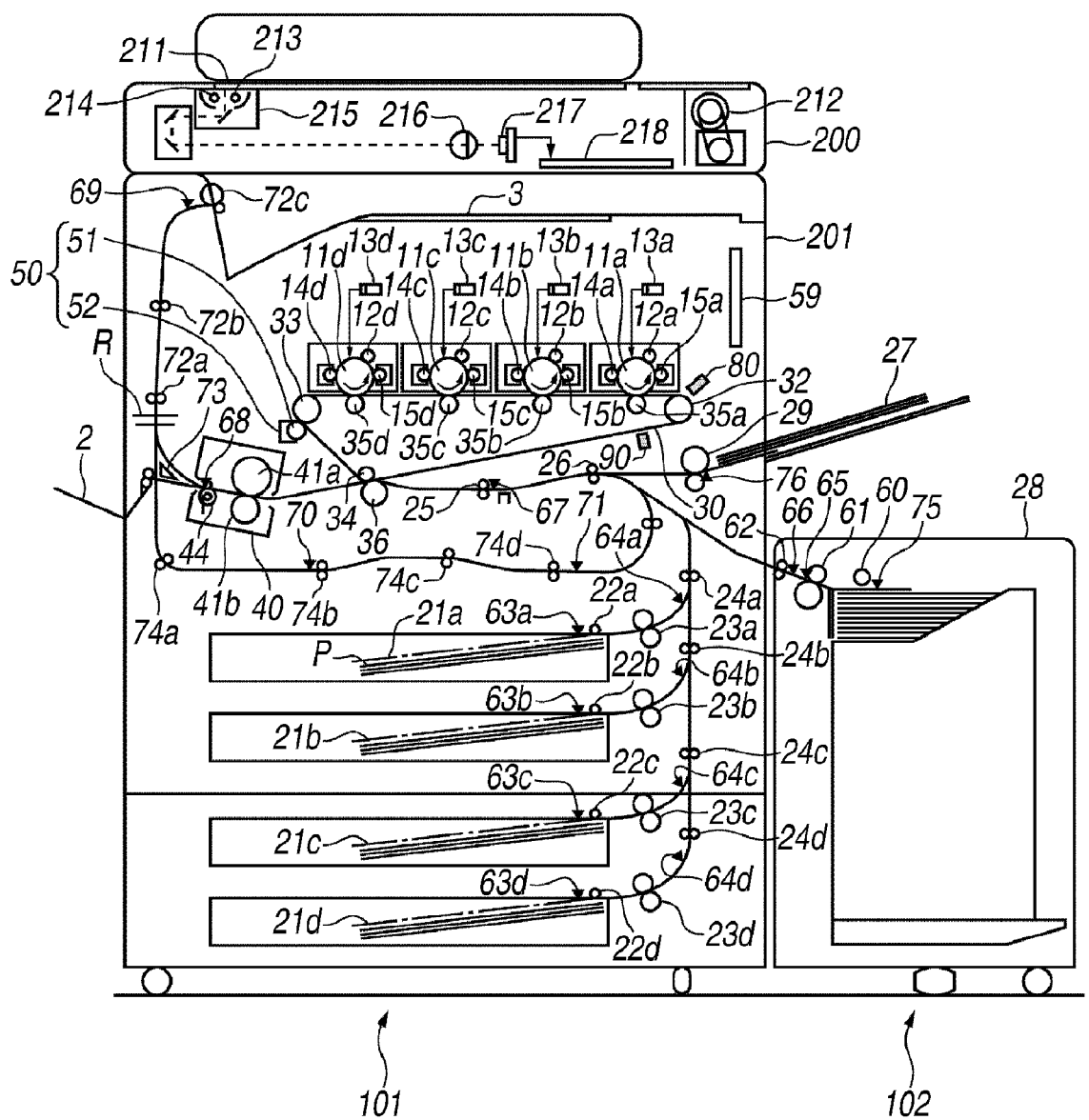
FIG. 2 illustrates a vertical cross section of a configuration of an image forming apparatus according to an exemplary embodiment of the present invention.

Now, an exemplary embodiment of the present invention will be described below. FIG. 2 illustrates a cross section of an image forming apparatus according to an exemplary embodiment. The image forming apparatus includes a color image forming apparatus 101 and a paper feed deck 102.

The color image forming apparatus 101 includes a digital color image reader unit (hereinafter simply referred to as a "reader unit") 200 and a digital color image printer unit (hereinafter simply referred to as a "printer unit") 201, which is disposed below the reader unit 200.

In the reader unit 200, a document is placed on a document positioning glass 211. With an optical system reading drive motor 212, a document scanning unit 215 exposes and scans the document at a previously set constant speed. The document scanning unit 215 includes exposure lamps 213 and 214. An image of reflection light from the document is focused onto a charge-coupled device (CCD) sensor (full color sensor) 217 with a lens 216 to obtain a color-separated image signal.

The full color sensor 217 includes a three-line CCD sensor having filters for respective colors of red, green, and blue (RGB), which are disposed adjacent to each other. The color-separated image signal is processed in a controller unit 218 and is then sent to the printer unit 201.

In the vicinity of the document positioning glass 211, an operation unit 307 (FIG. 3) is disposed. The operation unit 307 includes switches used for setting various modes related to a copy sequence, a display for displaying various information and setting values, and an indicator.

A printer control unit 59, which is a controller unit of the printer unit 201, includes a controller board having a central processing unit (CPU), a random access memory (RAM), and a read-only memory (ROM). The image forming apparatus controls, based on a control program stored in the ROM, the entire operation of a paper feed unit, an image forming unit, an intermediate transfer unit, a conveyance unit, a fixing unit, and an operation unit.

The image forming unit has a configuration described below. Each of photosensitive drums 11a, 11b, 11c, and 11d, each of which serves as an image carrier, is supported around an axis thereof and is rotated and driven by a driver motor (not shown) in a direction indicated by an arrow.

Roller charging devices 12a through 12d, scanner units 13a through 13d (scanning unit), development devices 14a through 14d, and cleaning devices 15a through 15d are disposed in sequence facing the respective outer peripheral surfaces of the photosensitive drums 11a through 11d in a rotational direction of the photosensitive drums 11a through 11d. The roller charging devices 12a through 12d charge the respective surfaces of the photosensitive drums 11a through 11d at an even charging level.

Each of the scanner units 13a through 13d exposes each of the photosensitive drums 11a through 11d to a light beam such as a laser beam modulated according to a recording image signal to form an electrostatic latent image onto each of the photosensitive drums 11a through 11d.

Each of the development devices 14a through 14d, storing therein a developer (hereinafter referred to as a "toner") of each of four colors of black, cyan, magenta, and yellow, visualizes the electrostatic latent image.

The visualized image is transferred onto an intermediate transfer belt 30. A residual toner remaining on each of the photosensitive drums 11a through 11d is collected by each of the cleaning devices 15a through 15d. With the above-described processing, images are serially formed with respective toners.

The paper feed unit includes a portion for stacking a recording material P, a roller for conveying the recording material P, a sensor for detecting passage of the recording material P through the paper feed unit, and a guide (not shown) for conveying the recording material P along a conveyance path.

The recording material P is stacked in cassettes 21a, 21b, 21c, and 21d, a manual feed tray 27, and a deck 28. With pickup rollers 22a, 22b, 22c, and 22d, the recording materials P are fed sheet by sheet from top to bottom.

The pickup rollers 22a through 22d may sometimes inadvertently feed a plurality of recording materials P. However, in such a case, B/C rollers 23a, 23b, 23c, and 23d are configured to ensure that the recording materials P are fed sheet by sheet. The recording material P, which is fed as a sheet with the B/C rollers 23a through 23d, is then conveyed by extraction rollers 24a through 24d and a pre-registration roller 26 up to a registration roller 25.

One sheet of the recording materials P stacked in the manual feed tray 27 is separated by B/C rollers 29 and is conveyed up to the registration roller 25 by the pre-registration roller 26. A plurality of recording materials P stacked in the deck 28 is fed to a paper feed roller 61 by a pickup roller 60. Then, one sheet is separated from the fed recording materials P by the paper feed roller 61 and is then conveyed to an extraction roller 62. Then, the recording material P is conveyed up to the registration roller 25 by the pre-registration roller 26.

The intermediate transfer unit will now be described in detail below. The intermediate transfer belt 30 includes a conductive elastic layer, made of polyurethane rubber, silicon rubber, or chloroprene rubber (CR rubber), formed on a base layer, and a surface layer, made of fluorocarbon resin or FKM, formed on the conductive elastic layer.

A drive roller 32 transmits driving force to the intermediate transfer belt 30. The intermediate transfer belt 30 is supported by the drive roller 32, a tension roller 33, and a driven roller 34. The tension roller 33 provides an appropriate tension to the intermediate transfer belt 30 with bias force from a spring (not shown). The driven roller 34 and a secondary transfer roller 36 form a secondary transfer area with the intermediate transfer belt 30 sandwiched therebetween.

The drive roller 32 is rotated to be driven by a stepping motor (not shown). On a back side of the intermediate transfer belt 30 at the position facing the photosensitive drums 11a through 11d across the intermediate transfer belt 30, primary transfer rollers 35a through 35d are disposed. Each of the primary transfer rollers 35a through 35d applies a high voltage adapted for transferring a toner image onto the intermediate transfer belt 30.

The secondary transfer roller 36 is disposed facing the driven roller 34. The secondary transfer roller 36 forms a secondary transfer area with a nip portion between the secondary transfer roller 36 and the intermediate transfer belt 30. The secondary transfer roller 36 is applied with pressure of an appropriate level against the intermediate transfer belt 30.

A cleaning device 50 is disposed on a downstream side of the secondary transfer area on the intermediate transfer belt 30. The cleaning device 50 is configured to clean an image forming surface of the intermediate transfer belt 30. The cleaning device 50 includes a conductive fur brush 51, a bias roller (not shown) for applying bias to the conductive fur brush 51, and a waste toner box 52 that stores waste toner.

A fixing unit 40 includes a fixing roller 41a, a roller 41b, and an inner paper discharge roller 44. The fixing roller 41a contains a heat source such as a halogen heater. The roller 41b is pressed by the fixing roller 41a (the roller 41b can include a heat source). The inner paper discharge roller 44 conveys the recording material P discharged from the roller 41b.

On a conveyance path for the recording material P, a plurality of sensors for detecting passage of the recording material P is disposed. More specifically, paper feed retry sensors 64a, 64b, 64c, and 64d, a deck paper feed sensor 65, a deck extraction sensor 66, a registration sensor 67, an inner paper discharge sensor 68, a face-down paper discharge sensor 69, a duplex preregistration sensor 70, and a duplex paper refeed sensor 71 are disposed on the conveyance path for the recording material P.

In the cassettes 21a, 21b, 21c, and 21d, cassette paper presence/absence sensors 63a, 63b, 63c, and 63d for detecting presence or absence of the recording material P are disposed. In the manual feed tray 27, a manual paper feed tray paper presence/absence sensor 76 for detecting presence or absence of the recording material P on the manual feed tray 27 is disposed. In the deck 28, a deck paper presence/absence sensor 75 for detecting presence or absence of the recording material P in the deck 28 is disposed.

An operation performed in conveying the recording material P from the cassette 21a, for example, will now be described below. When an image forming operation start signal is generated, a toner image formed on the photosensitive drum 11d, disposed at the most upstream position in the direction of rotation of the intermediate transfer belt 30, is primarily transferred onto the intermediate transfer belt 30 by the primary transfer roller 35d, to which a high voltage is applied. The toner image primarily transferred is conveyed to a primary transfer area of the subsequent photosensitive drum.

In each of the image forming units, image forming is performed with delay for a time period in which a toner image is conveyed through the image forming units. That is, the next toner image is transferred with a leading edge portion of the image aligned with a previous image. Thereafter, similar processing is repeated. Thus, toner images of four colors are primarily transferred onto the intermediate transfer belt 30.

Meanwhile, recording materials P are serially fed by the pickup roller 22a from the cassette 21a sheet by sheet. Then, the B/C rollers 23 convey the recording material P to the registration roller 25 via the extraction roller 24a and the pre-registration roller 26. At that time, the registration roller 25 is being stopped and a leading edge of the sheet contacts the nip portion.

Figure 15:
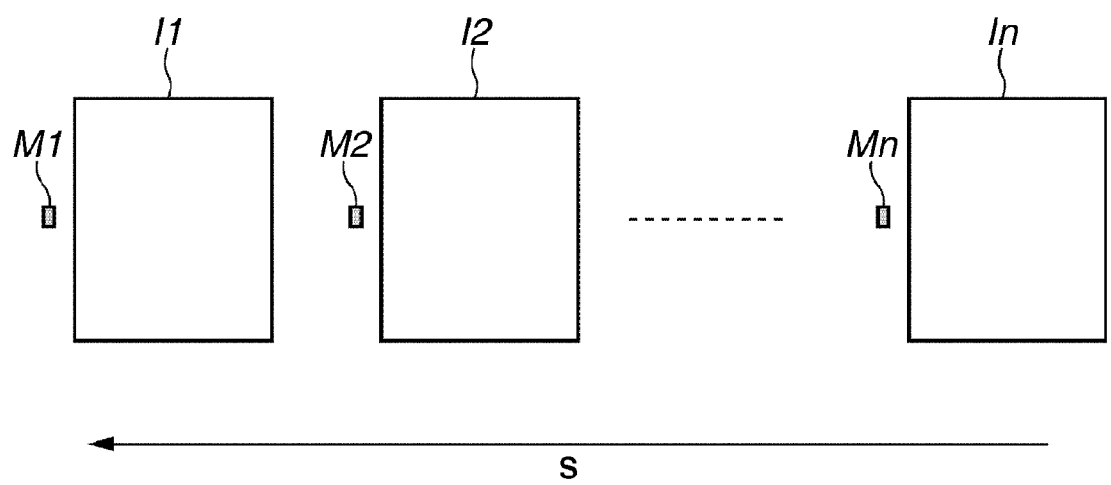
FIG. 15 illustrates a method for forming an image according to an exemplary embodiment of the present invention.

FIG. 15 illustrates a state in which a toner image transferred onto the intermediate transfer belt (carrying member) 30 is conveyed towards the secondary transfer roller 36. An embodiment can be implemented with a configuration in which a recording material is conveyed to a transfer unit with a belt, which serves as a conveyance member, and an image is transferred onto the recording material directly from each image forming unit (direct transfer method). In this case, a carrying member equivalent to an intermediate transfer belt serves as a conveyance member.

Referring to FIG. 15, an arrow S indicates a direction of traveling (direction of rotation) of the intermediate transfer belt 30. "I1" denotes the first image, and "M1" denotes a leading edge mark formed by the image forming unit for magenta.

Likewise, each of "M2" through "Mn" denotes a leading edge mark for images I2 through In. The leading edge marks Ml through Mn are detected by a leading edge mark detection sensor 90. The registration roller 25 starts rotating according to a timing at which the recording material P and each of the images I1 through In meet each other in the secondary transfer area.

Subsequently, the recording material P enters the secondary transfer area and contacts the intermediate transfer belt 30. Then, a high voltage is applied to the secondary transfer roller 36 at the timing at which the recording material P passes therethrough. Then, toner images of four colors formed on the intermediate transfer belt 30 according to the above-described processing are transferred onto the surface of the recording material P.

Then, the recording material P is guided to a fixing roller nip portion. Then, the toner images are fixed onto the surface of the recording material P with heat from the fixing unit 40 and pressure applied to the nip portion. Further, the recording material P is discharged onto a face-up paper discharge tray 2 or a face-down tray 3 depending on a direction of switching of a switching flapper 73.

In the case of two-sided printing, a recording material P having an image on the front surface thereof fixed by the fixing unit 40 passes through the inner paper discharge roller 44. Then, the switching flapper 73 switches a conveyance direction of the recording material P. Thus, the recording material P is conveyed towards reversing rollers 72a, 72b, and 72c.

When a trailing edge of the recording material P reaches a reversing position R, the reversing rollers 72a, 72b, and 72c are reversely rotated to convey the recording material P towards duplex conveyance rollers 74a, 74b, 74c, and 74d. Then, the recording material P is conveyed to the pre-registration roller 26 to perform image forming on a back surface of the recording material P.

In the vicinity of the intermediate transfer belt 30, a patch detection sensor 80 for detecting an image adjustment patch formed in an interval between print sheets is disposed.

Figure 5:
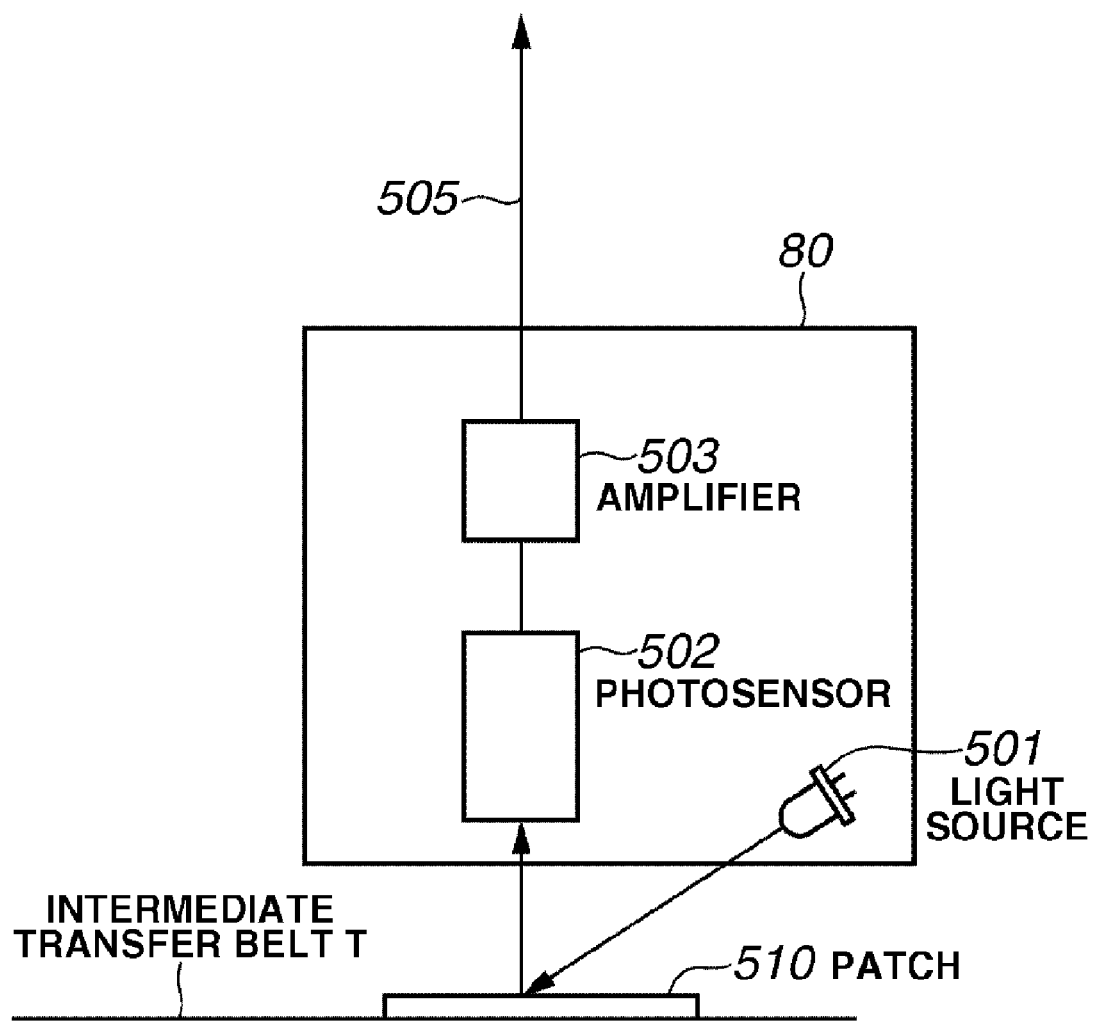
FIG. 5 illustrates an exemplary configuration of a patch detection sensor according to an exemplary embodiment of the present invention.

FIG. 5 illustrates a patch detection sensor 80 for detecting an image adjustment patch (pattern image) formed on the intermediate transfer belt 30, according to an embodiment. In particular, FIG. 5 illustrates an exemplary configuration of the patch detection sensor 80 and the relationship between an image adjustment patch and the patch detection sensor 80.

The patch detection sensor 80 includes a light source 501, a photosensor 502, and an amplifier 503. An image adjustment patch 510 is formed on the intermediate transfer belt T. The photosensor 502 detects a specular reflection component of light emitted from the light source 501 and reflected from the surface of the image adjustment patch 510. The amplifier 503 amplifies a signal from the photosensor 502 and outputs an amplified signal 505.

Figure 3:
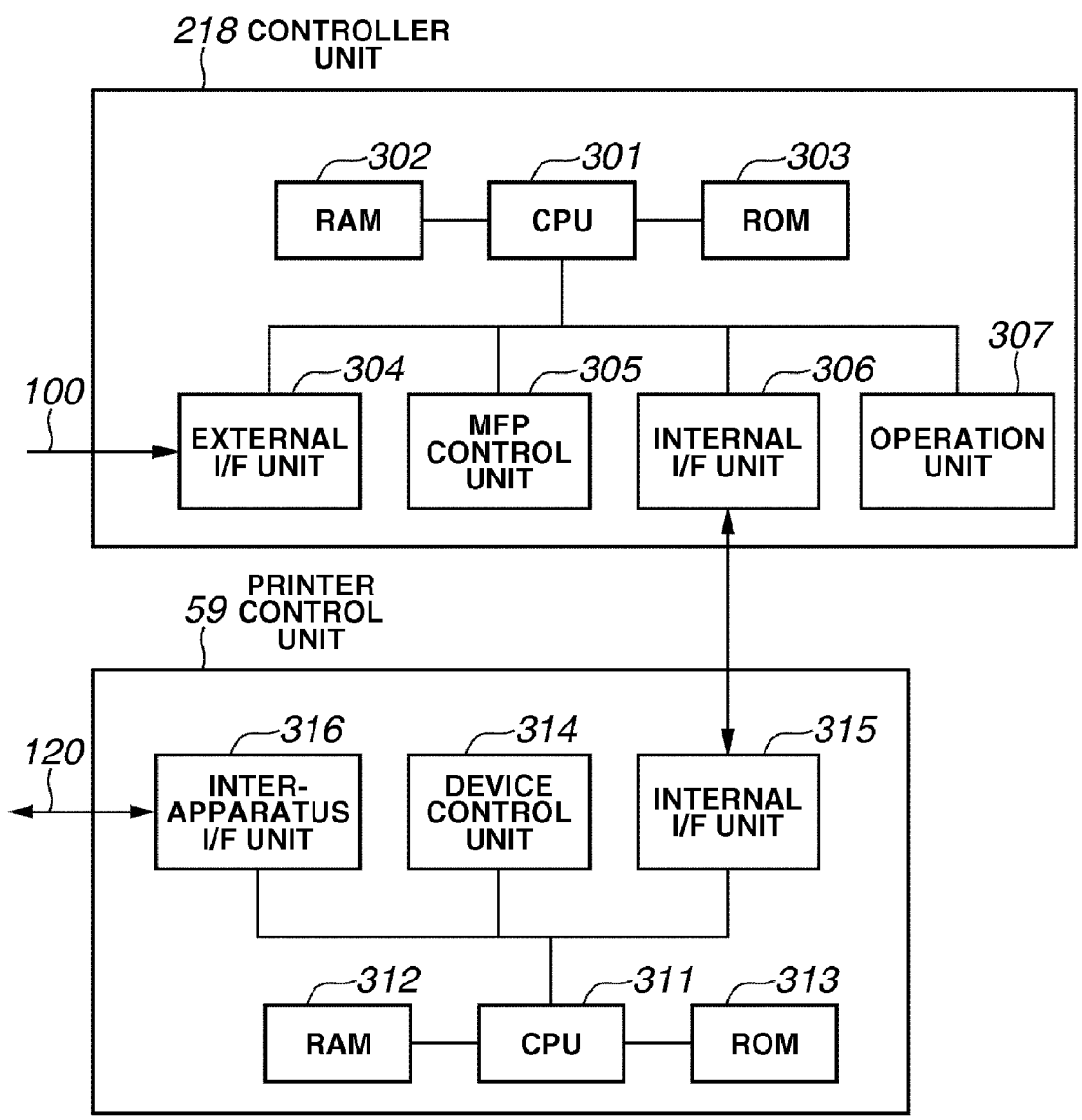
FIG. 3 is a block diagram of the image forming apparatus according to an exemplary embodiment of the present invention.

FIG. 3 schematically illustrates a control unit (a speed control unit, adjustment unit) according to an embodiment. A central processing unit (CPU) 301 of the controller unit 218 is connected to a read-only memory (ROM) 303 on which a control program is written and a random access memory (RAM) 302 storing data used for performing processing via an address bus and a data bus.

Furthermore, the CPU 301 is connected to an external interface (I/F) unit 304 and a multifunction peripheral (MFP) control unit 305. The external I/F unit 304 is used to communicate with an external apparatus 100. The MFP control unit 305 is used to perform processing, storing, and image processing of input image data such as scanned image data of a paper document or page description language (PDL) data from the external I/F unit 304. Moreover, an internal I/F unit 306 for communicating with the printer unit 201 is connected to the CPU 301.

In addition, the operation unit 307 is connected to the CPU 301. The CPU 301 controls a display unit and a key input unit of the operation unit 307. A user of the color image forming apparatus 101 can generate a command for switching a display to the CPU 301 via the key input unit. When the CPU 301 receives the command, the CPU 301 displays an operation state of the color image forming apparatus 101 and an operation mode set by a key input on the display unit of the operation unit 307.

A CPU 311 of the printer control unit 59 performs a basic control of an image forming operation. The CPU 311 is connected to a ROM 313 on which a control program is written and a RAM 312 storing data used for performing processing for an image forming operation. The ROM 313 stores program code of control processing, which is to be described later below.

A device control unit 314 is an electronic circuit including an input/output port for controlling each component member of the printer unit 201. An internal I/F unit 315 sends and receives an image signal and a timing signal to and from the controller unit 218. An inter-apparatus I/F unit 316 sends and receives sheet information and timing information to and from a sheet processing apparatus 120.

The CPU 311 receives an image signal via the controller unit 218 and the internal I/F unit 315 to perform an image forming operation by controlling the device control unit 314 according to the content of a control program. Furthermore, the CPU 311 sends and receives sheet information and timing information to and from another apparatus via the inter-apparatus I/F unit 316 to perform a sheet conveyance operation.

Figure 4:
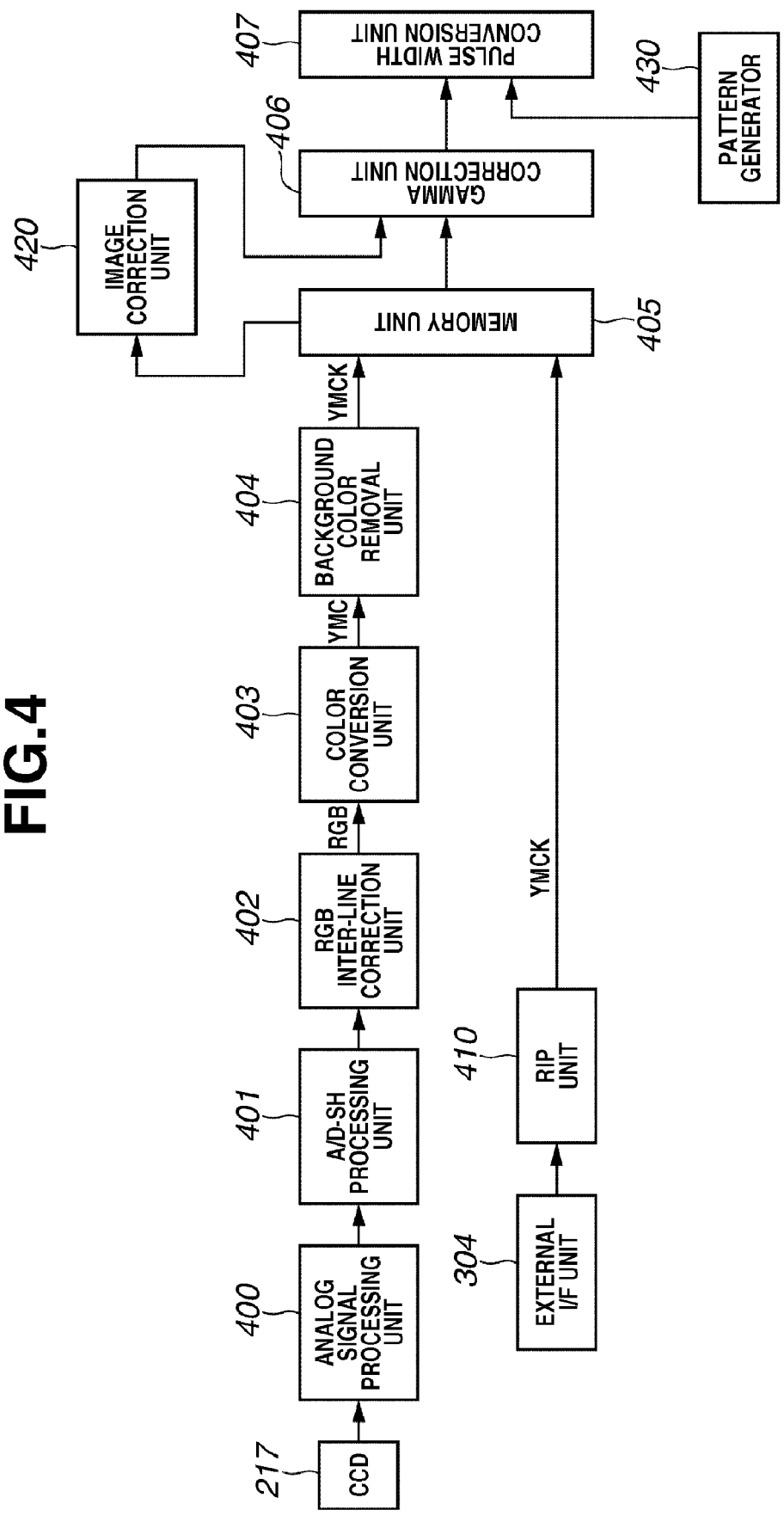
FIG. 4 is a block diagram illustrating an exemplary configuration of a multifunction peripheral (MFP) control unit according to an exemplary embodiment of the present invention.

FIG. 4 schematically illustrates an exemplary configuration of the MFP control unit 305 of the controller unit 218 according to an embodiment. The MFP control unit 305 can receive data output from the CCD sensor 217 of the scanner related to the copy operation or data output from the external I/F unit 304 related to a network printing operation.

A document image formed on the CCD sensor 217 is converted into an analog electrical signal by the CCD sensor 217. The converted image information is then input to an analog signal processing unit 400 to be subjected to sample-holding and dark level correction. Then, the image information is subjected to analog/digital conversion (A/D conversion) by an A/D-SH processing unit 401. Furthermore, the digitized signal is subjected to shading correction.

In the shading correction, unevenness per pixel in the CCD sensor 217 is corrected and unevenness in amounts of light emitted from a document illumination lamp at different positions occurring according to illumination characteristics of the document illumination lamp is corrected.

Subsequently, an RGB inter-line correction unit 402 performs RGB inter-line correction. Light input to each of RGB photosensing units of the CCD sensor 217 is shifted on the document according to a positional relationship between the RGB photosensing units, and accordingly, RGB signals are synchronized with one another during the RGB inter-line correction. Then, a color conversion unit 403 converts RGB signals into YMC signals according to direct mapping.

Then, a background color removal unit 404 generates a K signal from Y, M, and C signals. In this processing, a minimum value for a density of the Y, M, and C signals is subtracted as a gray component to obtain density signals Dy, Dm, and Dc for the respective Y, M, and C signals. Then, the gray component is adjusted for gain to obtain a density signal Dk for the K signal. The background color removal unit 404 stores the density signals Dy, Dm, Dc, and Dk in a memory unit 405.

Meanwhile, a raster image processing (RIP) unit 410 analyzes PDL data input from the external I/F unit 304, once converts the input image data into a standardized L*a*b* color space, and then converts the L*a*b* data into a YMCK color pace suitable to a printer that is a target of sending the data. Further, the RIP unit 410 generates Y, M, C, and K signals and stores the Y, M, C, and K signals in the memory unit 405.

An image correction unit 420 corrects the image data stored in the memory unit 405 using a density value of the image density adjustment patch image detected by the patch detection sensor 80, and then inputs the corrected image data to a gamma correction unit 406. If the image data does not need to be subjected to such correction, the image data in the memory unit 405 is directly input to the gamma correction unit 406.

The gamma correction unit 406, using a lookup table for each of colors Y, M, C, and K, converts the image density signal so that an image density in a default setting for a printer engine unit and a density of an output image processed according to gamma characteristics match each other.

A pulse width modulation unit 407 modulates the converted image density signal into a pulse-width modulated signal. The pulse-width modulated signal is then input to a laser driver of the printer control unit 59.

A pattern generator 430 generates a pattern of an image adjustment patch image to be formed between pages.

Figure 9B:
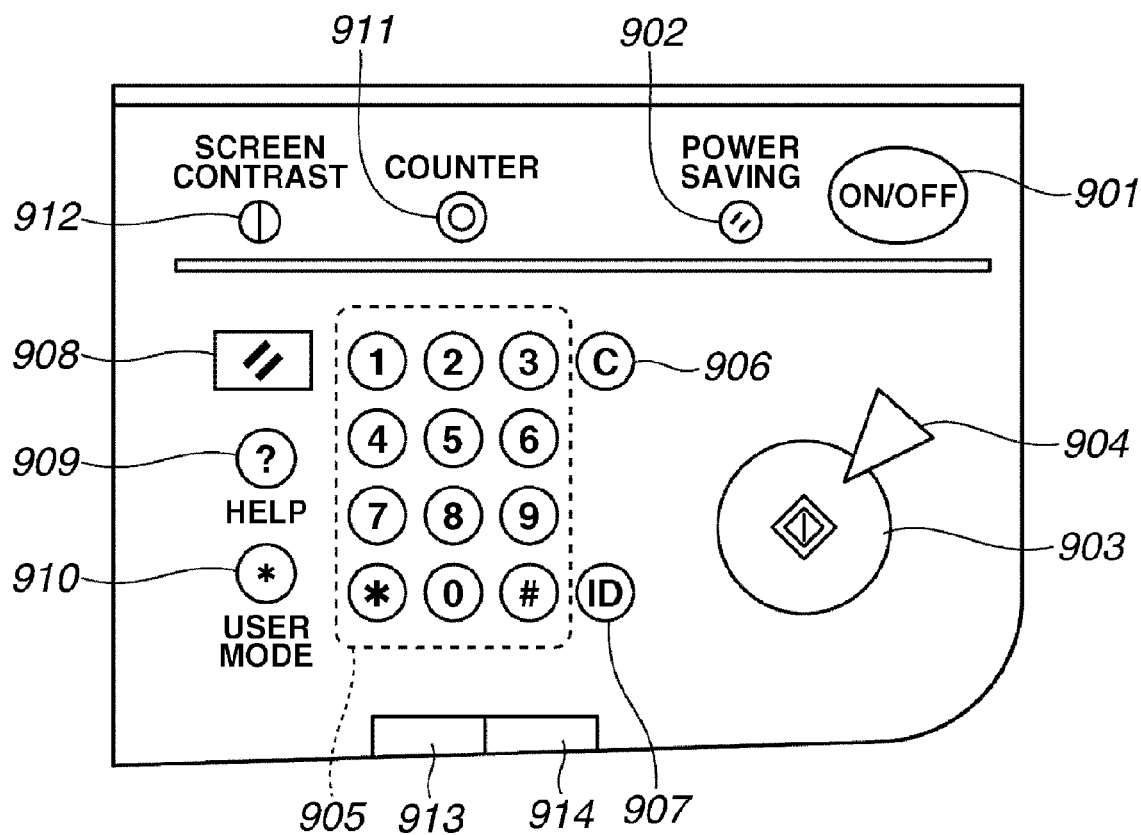

FIG. 9A illustrates the operation unit 307 according to an embodiment. The operation unit 307 includes a key input unit 9000 and a touch panel unit 9001. The key input unit 9000 and the touch panel unit 9001 are illustrated in detail in FIG. 9B and FIG. 9C, respectively. Hereinbelow, the key input unit 9000 and the touch panel unit 9001 are described in detail.

FIG. 9B illustrates an exemplary configuration of the key input unit 9000 via which the user of the color image forming apparatus 101 can perform operation settings. Referring to FIG. 9B, an operation unit power switch 901 is used for switching between a standby mode (normal operation state) and a sleep mode (poser saving state). The operation unit power switch 901 can be operated when a main power switch of the color image forming apparatus 101 used for supplying power to the color image forming apparatus 101 is set to be ON.

A power saving key 902 is used for saving power consumption by lowering a control temperature of a fixing device in the standby mode, although an extra period of time is taken until the color image forming apparatus 101 is set to a printable state. The control temperature can be further lowered by performing a setting as to a power saving ratio. A start key 903 is used for starting an instruction for copying and the like. A stop key 904 is used for stopping the copy operation and the like.

Numeral keys 905 are used for entering values for various settings. A clear key 906 is used for canceling the set values. An identification (ID) key 907 is used for entering a previously set password for authenticating an operator (user) of the color image forming apparatus 101.

A reset key 908 is used for nullifying various settings to return the settings to default states. A help key 909 is used for displaying guidance information and help information. A user mode key 910 is used for shifting to a user mode screen via which system settings and various adjustments are performed.

A counter confirmation key 911 is used for displaying the number of output prints stored in a soft counter that counts the number of prints. By operating the counter confirmation key 911, according to an operation mode such as a copy mode, a print mode, and a scan mode, a color mode such as a color mode and a monochromatic mode, and a page size such as large and small, the number of output prints in each of the modes can be displayed.

An image contrast dial 912 is used for adjusting viewability of the display screen by controlling light intensity of back light of a liquid crystal display of the touch panel unit 900.

An operation/memory lamp 913 can flash to notify the user of the color image forming apparatus 101 that a job is being processed and a memory is being accessed. An error lamp 914 can flash if a job cannot be processed, if an error of the type or level with which the user of the color image forming apparatus 101 should call a service person occurs, or in the case of an operator call notifying jamming of paper or shortage of consumables.

Figure 9C:
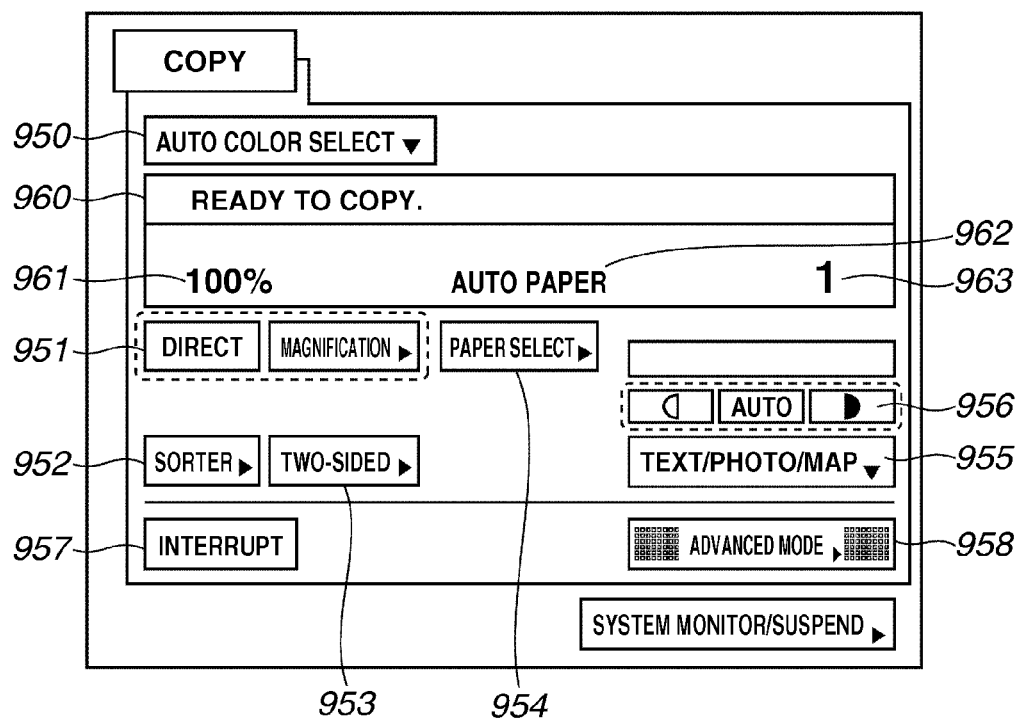

FIG. 9C illustrates an exemplary configuration of a liquid crystal display (LCD) and a touch panel display provided on the LCD and including a transparent electrode. It is previously programmed such that when the user touches the transparent electrode of a portion corresponding to a key displayed on the LCD with the finger, the LCD detects the touch of the finger and displays another operation screen. FIG. 9C illustrates a default screen in the standby mode, on which various kinds of operation screens can be displayed according to a setting operation performed by the user.

A color selection setting key 950 is used for performing a setting as to whether a copy operation is to be performed in a color copy mode, a monochromatic copy mode, or an automatic selection mode. A magnification setting key 951 is used for shifting to a screen via which a setting as to magnification such as "direct", "magnify", and "reduce" is performed. A post processing setting key 952 is used for shifting to a screen via which the user can perform a setting as to whether stapling or punching is to be performed and the number and positions of the stapling or the punching holes.

A side setting key 953 is used for shifting to a screen via which the user can make a selection as to whether the printing operation is performed in a one-sided printing mode or a two-sided printing mode. A paper size setting key 954 is used for shifting to a screen via which the user can select a paper feed stage, a paper size, and a medium type. An image mode setting key 955 is used for selecting an image mode suitable to a document image such as a text mode and a photo mode. A density setting key 956 is used for increasing or decreasing the density of an image to be output.

In a status display field 960, a state of the color image forming apparatus 101, as to whether the color image forming apparatus 101 is in a standby state or in a warm-up state, is simply displayed. In addition, if paper is jammed or an error occurs, such state is displayed in the status display field 960. In a magnification display field 961, the magnification set by operating the magnification setting key 951 is displayed. In a paper size display field 962, a paper size and a mode set by operating the paper size setting key 954 are displayed. In a print number display field 963, the number of prints designated by operating the numeral keys 905 is displayed. In addition, in the print number display field 963, a page number of the page currently being printed during the print operation is displayed.

An interrupt key 957 is used in interrupting a currently processed job with another job during a copy operation. An advanced mode key 958 is used for shifting to a screen via which the user can perform a setting for series copy and various settings for image processing and a layout related to a setting for a cover/slip sheet and a setting for a reduced layout and moving of images.

Changing of an image magnification page by page according to an embodiment will now be described in detail below.

Figure 8A:
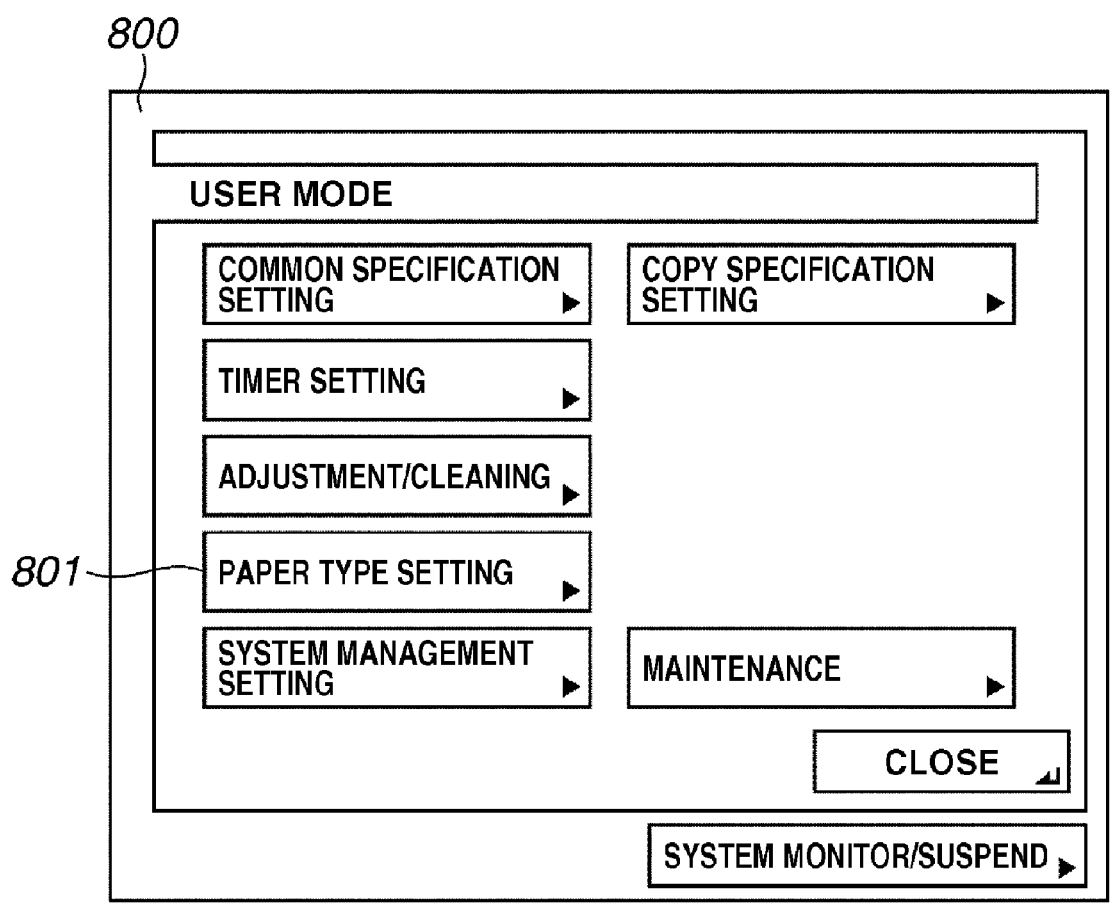
FIGS. 8A, 8B, and 8C each illustrate an example of a user mode screen according to an exemplary embodiment of the present invention.

First, a detailed description is made as to setting of an image magnification sheet by sheet. When the user operates the user mode key 910 in FIG. 9B, a user mode screen 800 illustrated in FIG. 8A is displayed.

Figure 8B:
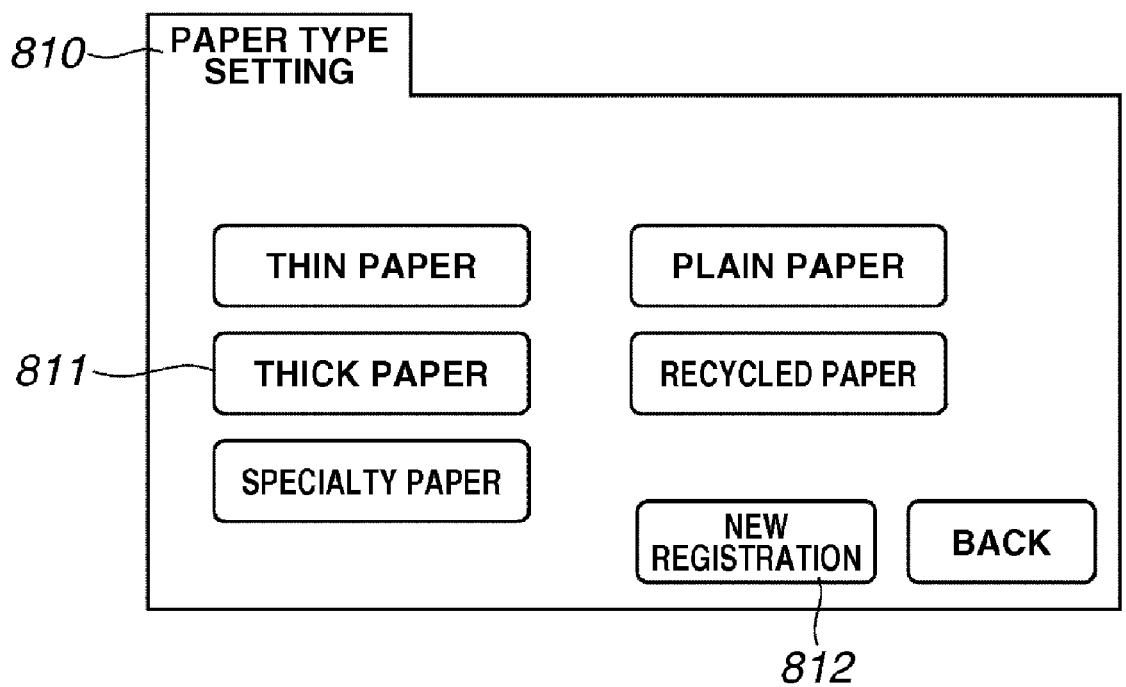

On the user mode screen 800, keys for various settings and items to be adjusted are displayed. When a "paper type setting" key 801 is selected by the user, a paper type setting screen 810 illustrated in FIG. 8B is displayed. On the paper type setting screen 810, keys for paper types registered via a screen (not shown) displayed by selecting a new registration key 812 are displayed.

Figure 8C:
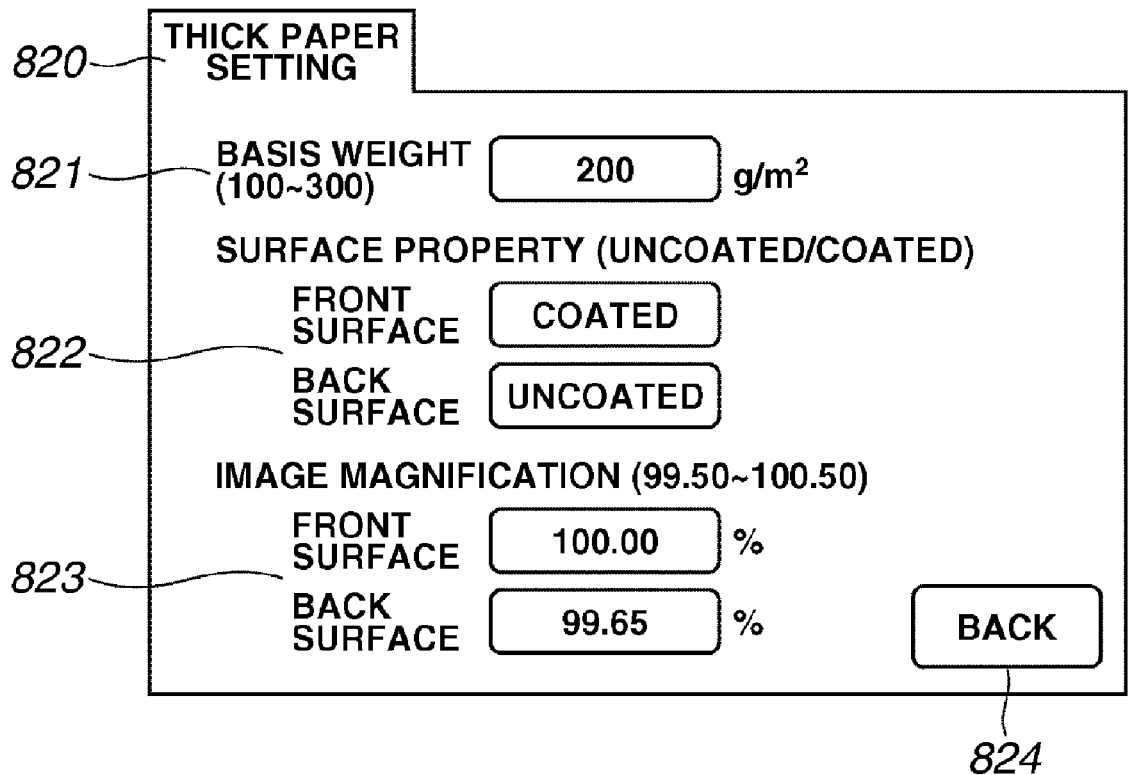

FIG. 8C illustrates an exemplary configuration of a thick paper setting screen 820 displayed when the user selects a thick paper key 811 in FIG. 8B. In a paper basis weight setting field 821, the user enters a numerical value within a displayed range with the numeral keys 905 in the operation unit 307. In a surface property setting field 822, a surface property such as "uncoated" and "coated" is displayed in a toggle manner for both the front and back surfaces of the print paper, when the user presses the surface property setting field 822.

In an image magnification setting field 823, the user enters a value within a displayed range with the numeral keys 905. In an embodiment, the setting can be performed in increments (decrements) of 0.01% for both the front and back surfaces of the print paper. A return key 824 is used for returning to the paper type setting screen 810.

Figure 16A:
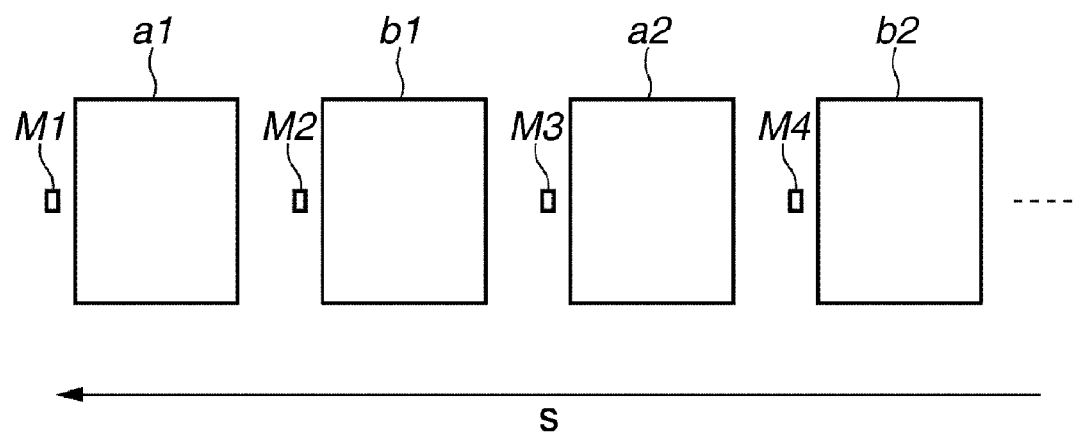
FIGS. 16A and 16B illustrate image forming in the case of image magnification change and two-sided printing, respectively, according to an exemplary embodiment of the present invention.

FIG. 16A illustrates an example of images in a case where a plain paper sheet and a thick paper sheet are alternately fed from the cassette 21a and the cassette 21b, respectively. An arrow S indicates a direction of advancing of images. "M1" through "M4" each denote a leading edge mark formed in the image forming unit for magenta. "a1" and "a2" each denote an image to be transferred onto the front surface of a plain paper sheet fed from the cassette 21a. "b1" and "b2" each denote an image to be transferred onto the front surface of a thick paper sheet fed from the cassette 21b.

Suppose that the image magnification for the front surface of the plain paper sheet is set at 99.98% and the image magnification for the front surface of the thick paper sheet is set at 100.00%. In this case, the rotation speed of the scanner motor is controlled to be changed to change the image magnification for each of the images.

Figure 16B:
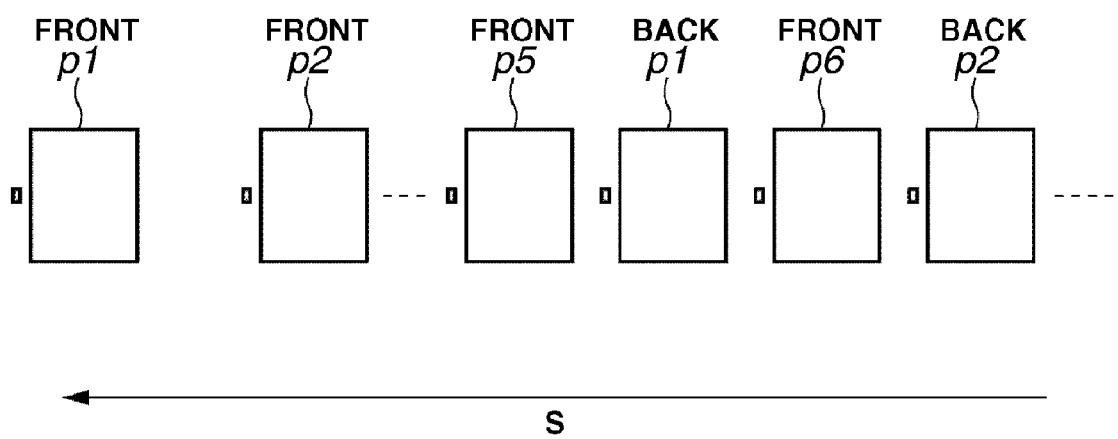

FIG. 16B illustrates an example of images in the case of printing on both sides of a plain paper sheet fed from the cassette 21a. An arrow S indicates a direction of advancing of images. In FIG. 16B, p1, p2 . . . , p5, and p6 denote pages that are printed on plain sheets serially fed from the cassette 21a. Images are printed on the plain paper sheets in order of p1 front surface, p2 front surface . . . , p5 front surface, p1 back surface, p6 front surface, p2 back surface, and so forth.

Suppose that the image magnification for the front surface of the plain paper sheet is set at 100.00% and the image magnification for the back surface thereof is set at 99.97%. In this case, the rotation speed of the scanner motor is controlled to be changed in the intervals between images for the p5 front surface and the p1 back surface, the p1 back surface and the p6 front surface, and the p6 front surface and the p2 back surface, respectively, to change the image magnification for each of the images.

The scanner motor rotation speed control performed in the interval between pages to change the image magnification will now be described below.

Figure 6:
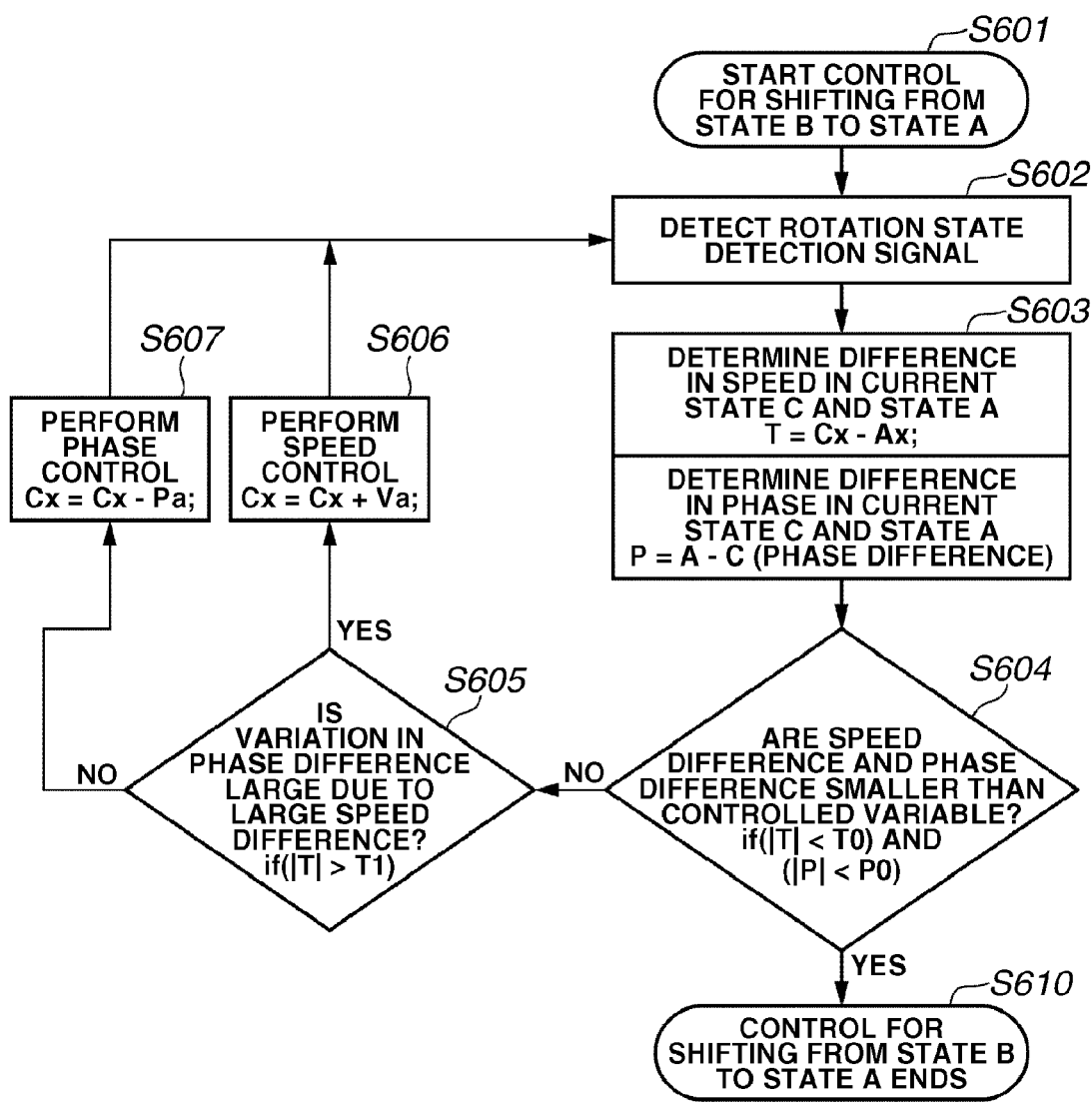
FIG. 6 is a flow chart illustrating a flow of processing for changing the rotation speed of a scanner motor according to an exemplary embodiment of the present invention.
Figure 13:
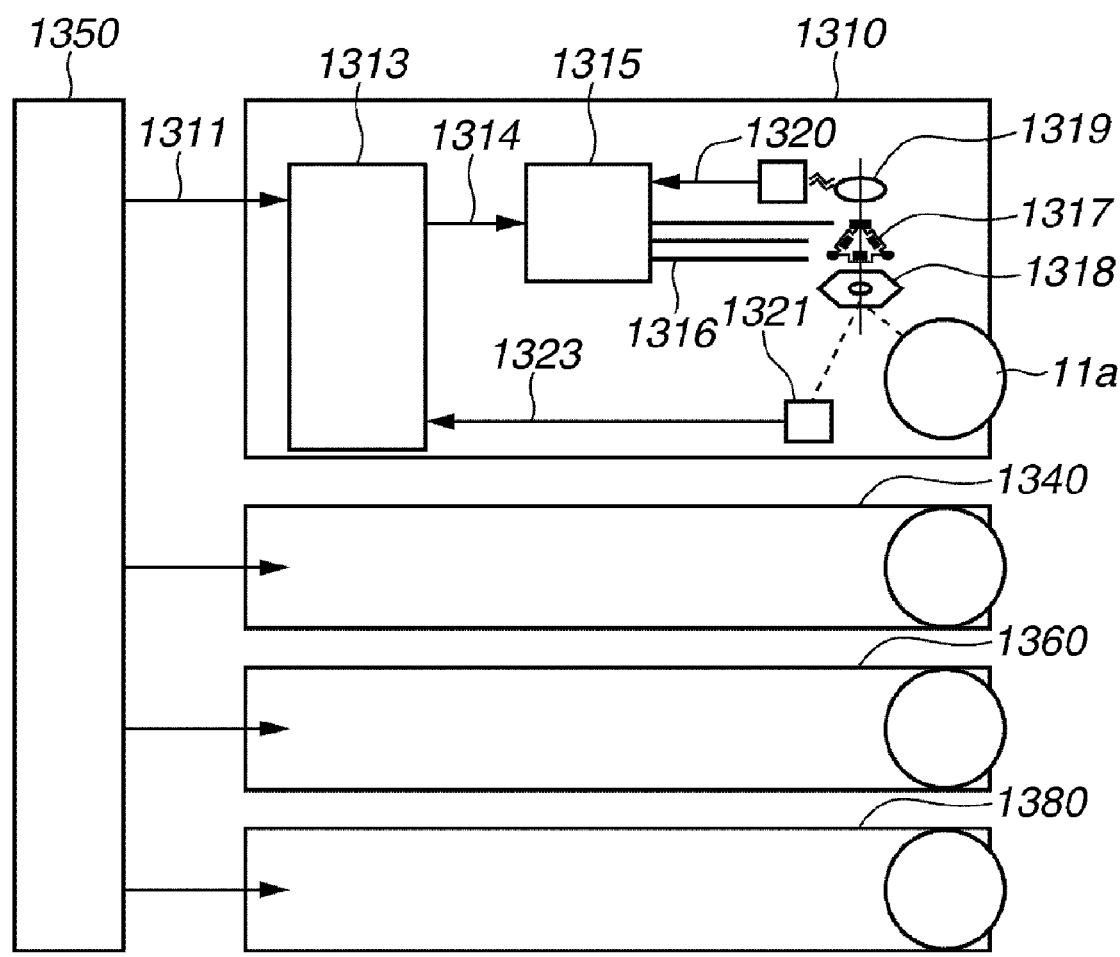
FIG. 13 illustrates a scanner motor speed changing unit according to an exemplary embodiment of the present invention.

FIG. 6 is a flow chart illustrating feedback control processing performed in shifting a motor rotation speed and a rotation phase in a state A to a motor rotation speed and a rotation phase in a state B. FIG. 13 illustrates an exemplary configuration of a scanner motor control unit included in the device control unit 314 illustrated in FIG. 3. In the feedback control processing, the scanner motor included in the scanner unit, which is a scanning unit, is controlled.

The configuration illustrated in FIG. 13 is simply described below.

The scanner motor control unit includes a circuit 1350 for generating a signal which is a reference for the rotation speed and a rotation phase of each of four scanner motors (hereinafter referred to as a "rotation reference signal") and a first motor control unit 1310. The first motor control unit 1310 includes a rotation reference signal 1311, a BD signal 1323 obtained from a polygonal mirror 1318, a speed increasing/decreasing instruction signal 1314, and a control computation unit 1313 that generates the speed increasing/decreasing signal 1314 based on a difference between inputs from the rotation reference signal 1311 and the BD signal 1323.

In addition, the first motor control unit 1310 includes a motor driver 1315, and a motor excitation coil 1317. Reference numeral 1316 denotes phase excitation by which power is supplied to the motor excitation coil 1317. Furthermore, the first motor control unit 1310 includes a polygonal mirror 1318, which is a rotating polygonal mirror, a motor permanent magnet 1319, an FG signal 1320, the photosensitive drums 11a, and a BD sensor 1321.

The scanner motor control unit further includes control units 1340, 1360, and 1380 for controlling the second, third, and fourth motors, respectively. Each of the second thorough fourth motor control units 1340, 1360, and 1380 has a configuration similar to the first motor control unit 1310. Accordingly, a detailed description thereof is not repeated here.

FIG. 6 illustrates a flow of processing for controlling a rotation speed of a scanner motor according to an embodiment. In step S601, a condition occurs in which a stable initial state B is desired to be shifted to a state A, in which the rotation speed of the motor differs from that in the state B. For easier understanding of the description, FIG. 7 illustrates an example of periodic signals in a state C and in a state A. The state C refers to a current state. The state C matches the state B at the time of the start of the control. The state C matches the state A after the control is completed. Periods of signals in the state C and the state A are indicated as "Cx" and "Ax", respectively. The periods differ from each other because the rotation speeds in the state A and the state C differ from each other.

With respect to the state B and the state A, the rotation speed and the rotation phase are determined related to drawing of an image in each of the states A and B. Accordingly, in an embodiment, a phase relationship cannot be arbitrary, and each phase is fixed with respect to absolute time. For specific values, suppose that the magnification is changed by 5%. Accordingly, Cx=1050 µs (first scanning speed) and Ax=1000 µs can be set.

In step S602, the first motor control unit 1310 detects a rotation state detection signal. More specifically, the rotation state detection signal is obtained from a polarity signal of a DC brushless motor and a Hall element. The rotation state detection signal includes a rotation synchronization signal (hereinafter referred to as an "FG signal") or a rotating polygonal mirror surface position detection signal obtained using a rotating polygonal mirror, an emitted laser beam, and a reflection light sensor. The rotating polygonal mirror surface position detection signal is hereinafter referred to as a "BD signal". Here, an example using a BD signal is described.

In step S603, the first motor control unit 1310 determines and computes a speed difference and a phase difference based on a detected timing. That is, the first motor control unit 1310 determines differences between the current phase and rotation speed and the targeted phase and rotation speed. The difference is digitally determined based on a crystal oscillator output (0.1 µs), which period is sufficiently shorter than a BD period (for example, 1,000 µs), with a counter such as a clock synchronous sequential circuit operating based on the crystal oscillator output, and is determined at a periodic timing in the state C or the state A. Values to be determined are expressed by the following expressions.

Current speed difference $T=Cx-Ax$, and

Current phase difference P=refA (see FIG. 7).

In step S604, the first motor control unit 1310 determines whether the control for shifting the state is completed. The first motor control unit 1310 makes a determination with respect to an allowable residual speed difference T0 and an allowable residual phase difference P0 for the following condition.

if $((|T|<T0)$ AND $(|P|<P0))$

If it is determined in step S604 that the above-described condition is satisfied (YES in step S604), the processing proceeds to a stable control operation. Then, the state shifting control ends in step S610. On the other hand, if it is determined in step S604 that the above-described condition is not satisfied (NO in step S604), then the processing proceeds to selection of a method for increasing/decreasing the speed in step S605.

In this regard, in a conventional method, if a speed difference is large, a phase difference is determined to be insignificant. In particular, when the higher speed is more than twice as large as the lower speed, two or more periodic signals of the shorter period exist in one period of a periodic signal of the longer period, and accordingly, a condition is necessary to be employed for a method of determining the phase difference.

If the speed difference T satisfies the following condition with respect to a residual speed difference threshold value T1 (YES in step S605), then the first motor control unit 1310 performs speed control in step S606.

if $(|T|>T1)$

On the other hand, if the speed difference T does not satisfy the above condition (NO in step S605), then the first motor control unit 1310 performs phase control in step S607. Here, the speed control refers to processing for increasing and decreasing the speed so as to match the speeds regardless of the phase, and the phase control refers to processing for increasing and decreasing the speed so as to match the phases regardless of the speed.

The speed control and the phase control can be performed at the same time depending on the type of a control method. If both the speeds and the phases do not match each other and directions of the control amount for the speed and the phase differ from each other, the speed control is preferentially performed using a gain level ratio.

Figure 10A:
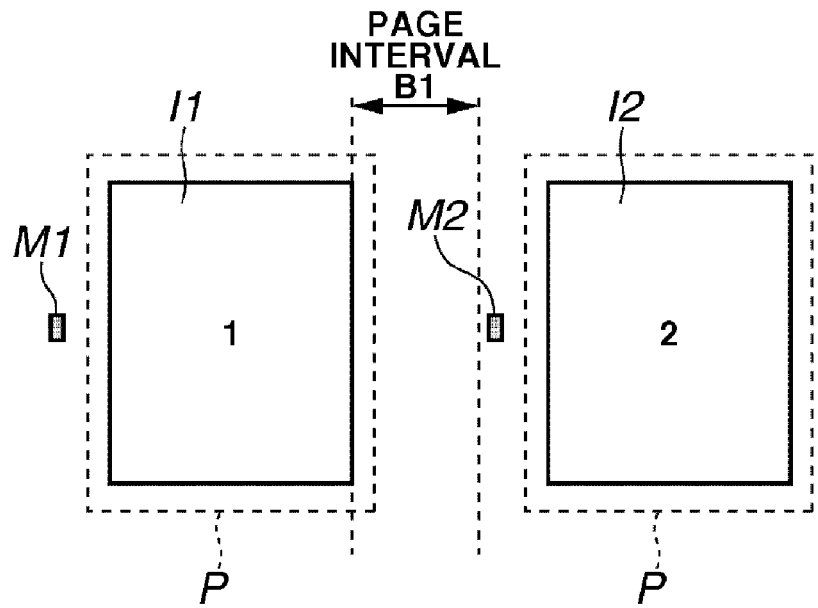
FIGS. 10A and 10B each illustrate the location of page images according to an exemplary embodiment of the present invention.

A relationship between positions of images in a case where the speed of the scanner motor is changed in an interval between pages is now described with reference to FIG. 1A. Referring to FIG. 10A, "I1" denotes an image on the first page. "M1" denotes a leading edge mark for the image I1. "I2" denotes an image on the second page. "M2" denotes a leading edge mark for the image I2. "P" denotes an area corresponding to a paper sheet.

The control for changing the speed of the scanner motor starts with a trailing edge of the image I1 on the first page. When the speed change is completed, image forming of the leading edge mark M2 for the next image can be performed. Accordingly, a page interval B1 can be obtained. That is, a page interval equivalent to the time taken for changing the speed is the page interval B1.

An image adjustment patch image formed in the interval between pages is now described below.

Figure 12A:
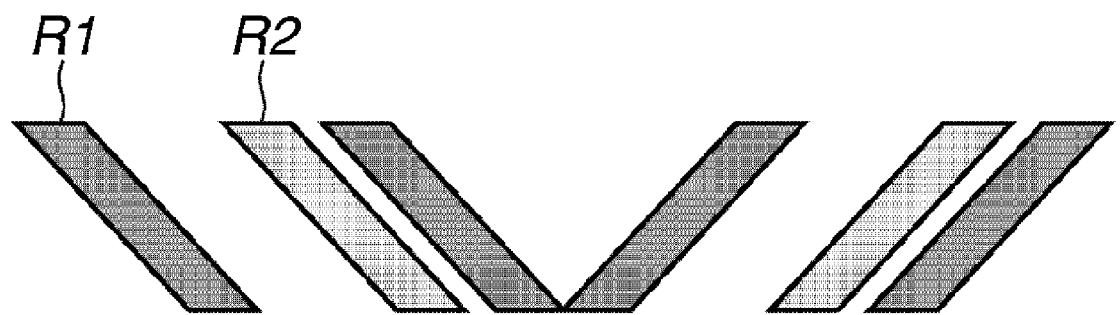
FIGS. 12A and 12B each illustrate an example of an image adjustment patch according to an exemplary embodiment of the present invention.
Figure 12B:
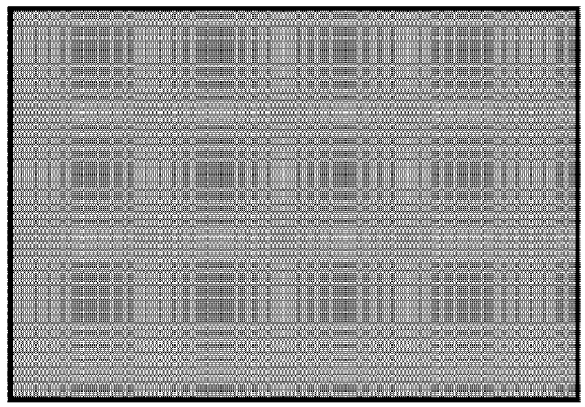

FIG. 12A illustrates an example of a registration patch image. FIG. 12B illustrates an image density adjustment patch image. Image data of a patch image is generated by the pattern generator 430 in FIG. 4.

The registration patch image includes a pattern R1 for magenta, which is a reference color, and patterns for another color (a pattern R2 for yellow in FIG. 12A), and enables determination of an amount of deviation from the reference color magenta. Registration patch images are serially formed at page intervals (between sheets) using magenta and another color as a set.

A method for obtaining a deviation from the reference color magenta will be described below with reference to FIG. 11. With respect to the formed registration pattern image, distances A1, A2, B1, and B2 are detected by the patch detection sensor 80.

Then, based on a result of the detection, an amount of deviation with respect to the reference color magenta is computed by the following expressions.

$\Delta H=\{(B2-B1)/2-(A2-A1)/2\}/2$ $\Delta V=\{(B2-B1)/2+(A2-A1)/2\}/2$

Where "$\Delta H$" denotes an amount of deviation in a main scanning direction and "$\Delta V$" denotes an amount of deviation in a sub scanning direction. Then, the adjustment operation is performed so that a result of the computation can be reflected in the next image forming operation.

With respect to the image density adjustment patch image, a density thereof is read by the patch detection sensor 80, and the image correction unit (adjustment unit) 420 corrects the image density based on the read density (result of detection).

Here, each of the registration patch image and the image density adjustment patch image is formed every a predetermined number of pages in a print job. In an embodiment, the image density adjustment patch image is formed in a page interval after every odd-numbered page, and the registration path image is formed in a page interval after every even-numbered page for every 100 pages.

Figure 10B:
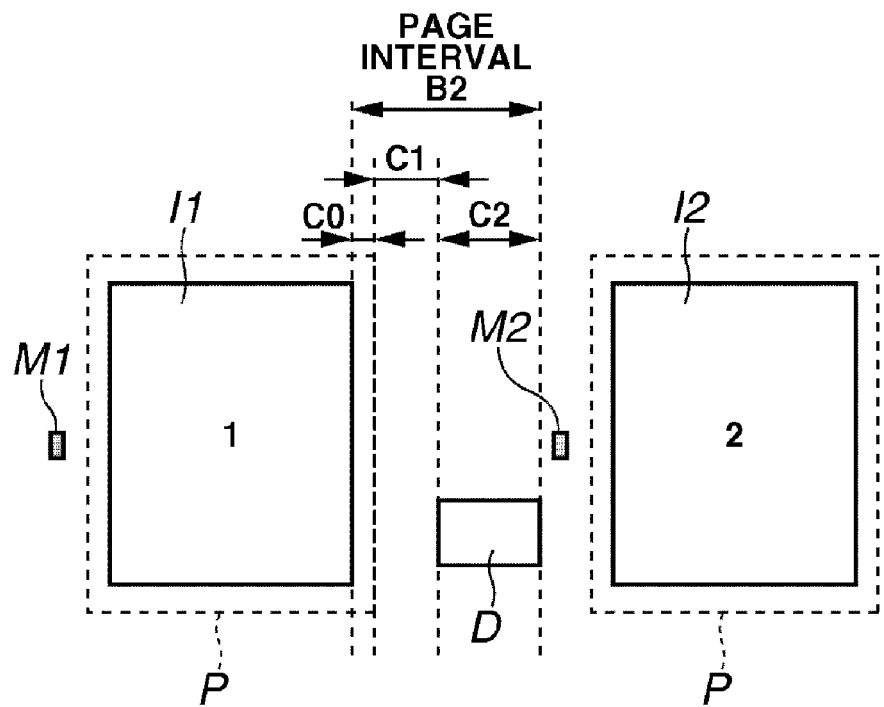

A relationship between image positions in a case where an image adjustment patch image is formed in a page interval will now be described below with reference to FIG. 10B. Here, assume that the speed of the scanner motor is not changed. Accordingly, the page interval B1 required for the speed change is not considered. Referring to FIG. 10B, "I1" denotes an image on the first page. "M1" denotes a leading edge mark for the image I1. "I2" denotes an image on the second page. "M2" denotes a leading edge mark for the image I2. "D" denotes an image adjustment patch image. "P" denotes an area corresponding to a paper sheet.

"C0" denotes a margin in a trailing edge portion of the image formed on the paper sheet P. "C1" denotes a toner scattering prevention area for preventing toner for the image adjustment patch image D from scattering onto the paper sheet P. "C2" denotes the length of the image adjustment patch image D in the sub scanning direction. A page interval B2 can be expressed by the following expression.

$B2=C0+C1+C2$

Now, a case where both the speed change of the scanner motor and the forming of an image adjustment patch image are performed in a page interval will now be described below with reference to FIG. 1A and FIG. 1B.

For example, in the case of two-sided printing, if the image magnification for the front surface and the image magnification for the back surface differ from each other, the speed of the scanner motor needs to be changed in order to change the image magnification between the images on the front and the back surfaces or in a page interval between the images on the front and the back surfaces. In addition, in a page interval after an odd-numbered page, an image density adjustment patch is formed. Accordingly, both changing of the scanner motor speed and forming of an image density adjustment patch image need to be performed in the same page interval (in the same sheet interval).

Figure 1A:
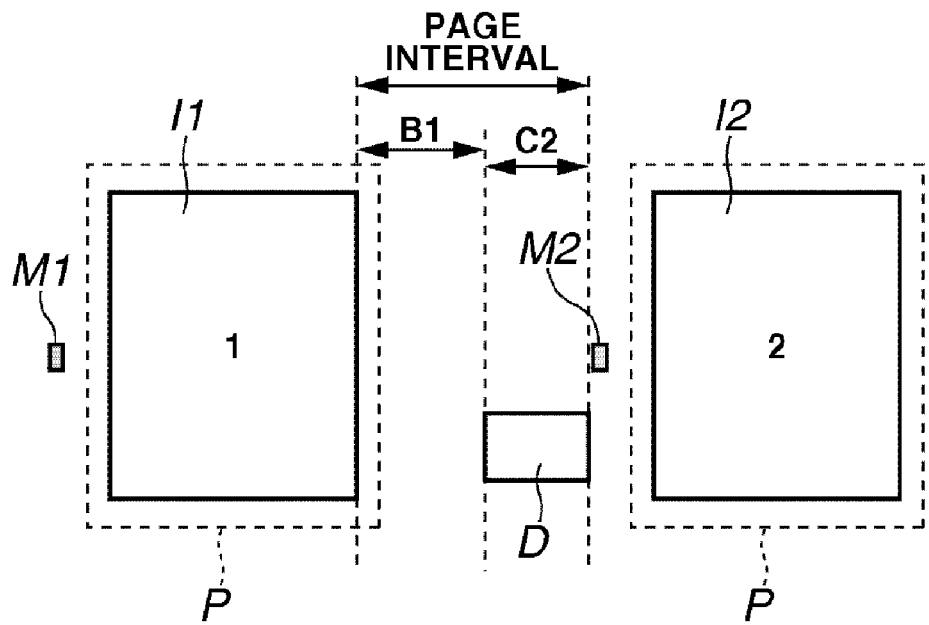
FIG. 1A and FIG. 1B each illustrate the location of page images according to an exemplary embodiment of the present invention.

FIG. 1A illustrates a relationship between image positions in a case where the changing of the scanner motor speed is performed in a page interval before forming an image adjustment patch image according to an embodiment.

Referring to FIG. 1A, "I1" denotes an image on the first page. "M1" denotes a leading edge mark for the image I1. "I2" denotes an image on the second page. "M2" denotes a leading edge mark for the image I2. "D" denotes an image adjustment patch image. "P" denotes an area corresponding to a paper sheet. "B1" denotes a scanner motor speed changing area. "C2" denotes the length of the image adjustment patch image D in the sub scanning direction.

In the example illustrated in FIG. 1A, the control for changing the scanner motor speed starts with a trailing edge portion of the image on the first page. After the speed change is completed, the image adjustment patch image D is formed. Accordingly, a page interval between the first and the second pages can be expressed by "B1 (interval equivalent to the time required for changing the speed)+C2".

Figure 1B:
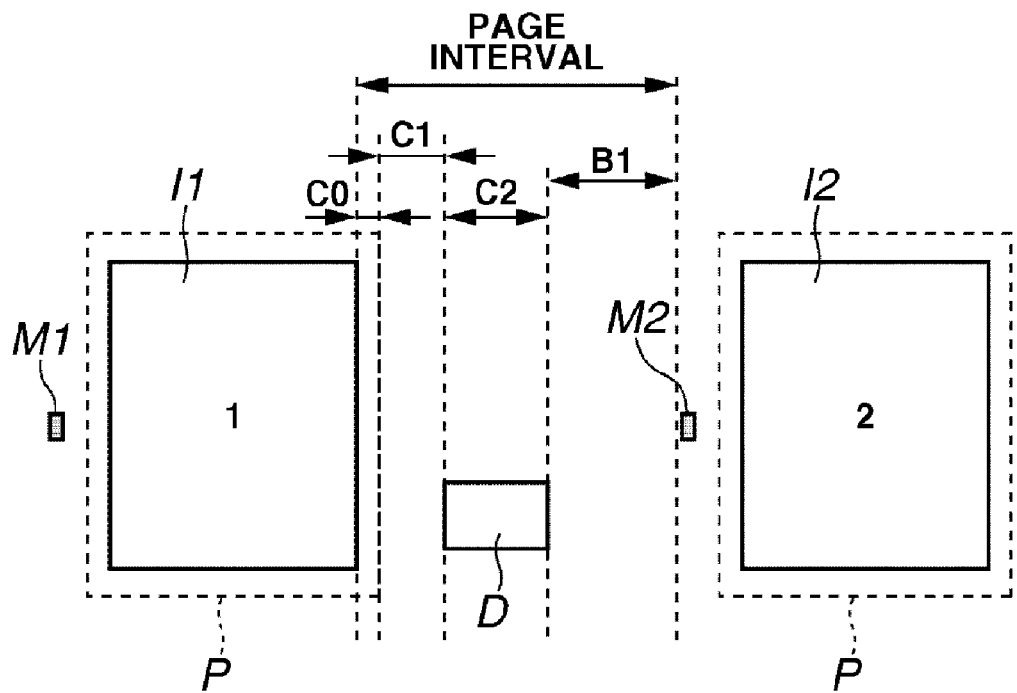

FIG. 1B illustrates a relationship between image positions in a case where an image adjustment patch image is formed in a page interval before changing the scanner motor speed, as a comparative example to the example in FIG. 1A. Referring to FIG. 1B, "I1" denotes an image on the first page. "M1" denotes a leading edge mark for the image I1. "I2" denotes an image on the second page. "M2" denotes a leading edge mark for the image I2. "D" denotes an image adjustment patch image. "P" denotes an area corresponding to a paper sheet.

"C0" denotes a margin in a trailing edge portion of the image formed onto a paper sheet P. "C1" denotes a toner scattering prevention area for preventing toner for the image adjustment patch image D from scattering onto the paper sheet P. "C2" denotes the length of the image adjustment patch image D in the sub scanning direction. "B1" denotes a scanner motor speed changing area. In the example illustrated in FIG. 1B, a page interval between the first and the second pages can be expressed by "C0+C1+C2+B1". As a result of mutual comparison of the examples in FIGS. 1A and 1B, it is apparent that in the case of the example illustrated in FIG. 1A, a page interval can be shorter than that in the case of the example illustrated in FIG. 1B.

Thus, in an embodiment, the changing of the scanner motor speed is first performed. Accordingly, it is not required to provide a toner scattering prevention area C1 for preventing toner for the image adjustment patch image D from scattering onto the paper sheet P, which is required to be provided in the comparative example. That is, in an embodiment, the scanner motor speed changing area B1 also serves as the toner scattering prevention area C1.

Furthermore, in the comparative example, the margin C0 in a trailing edge portion of the image formed on the paper sheet P needs to be provided. In an embodiment, on the other hand, the scanner motor speed can be changed immediately after the forming of the image I1 is completed. Accordingly, in an embodiment, a time corresponding to the margin C0, which is required in the comparative example, can be reduced. Thus, according to an embodiment, a page interval can be reduced as much as the interval expressed by "C0+C1".

A method for changing the scanner motor speed and forming an image adjustment patch image in a page interval will now be described with reference to the flow chart of FIG. 14.

Figure 14:
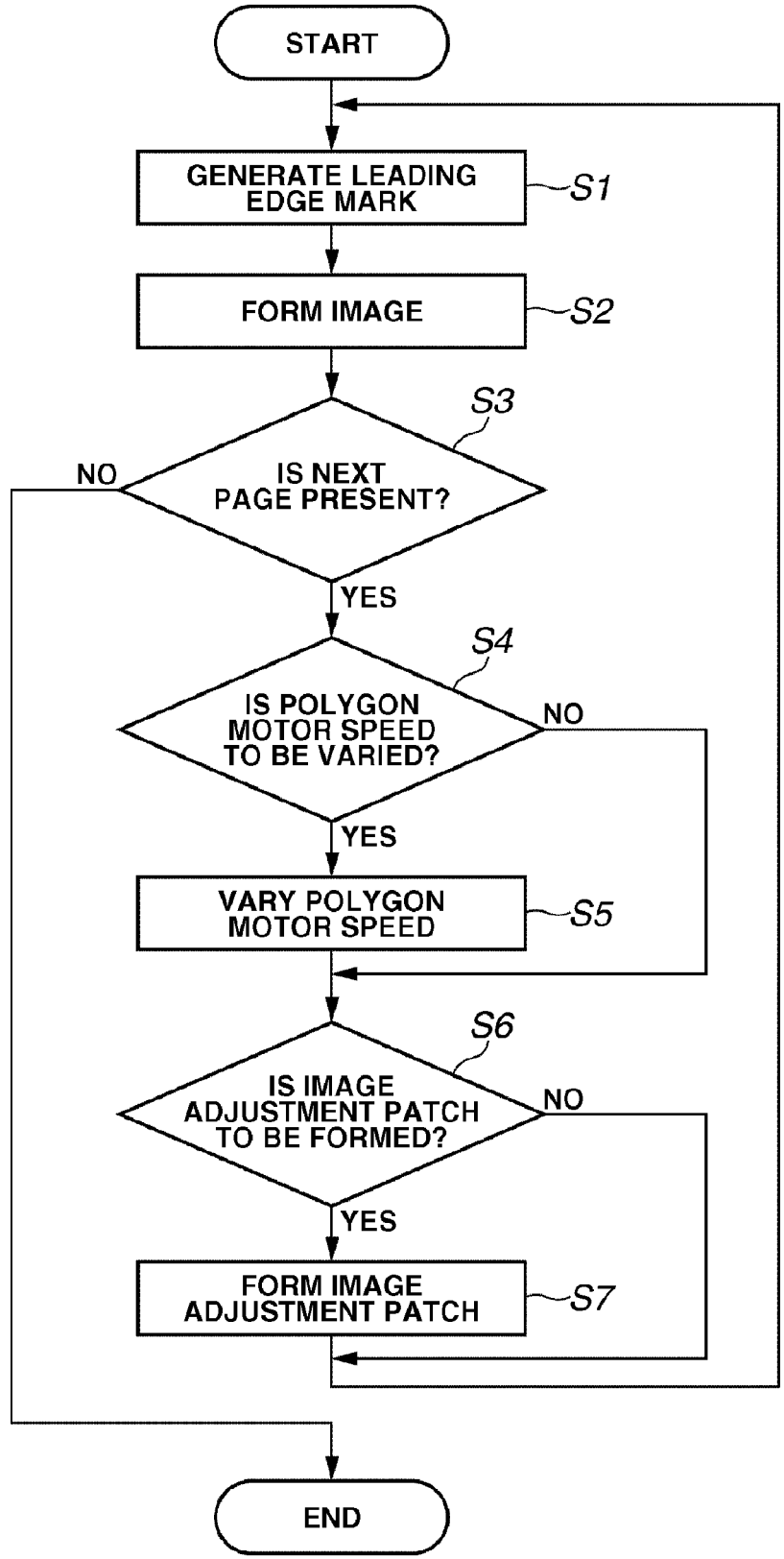
FIG. 14 is a flow chart illustrating processing for generating a page interval according to an exemplary embodiment of the present invention.

Referring to FIG. 14, when the print operation starts, in step S1, the color image forming apparatus 101 forms a leading edge mark for an image to be formed next. In step S2, the color image forming apparatus 101 forms an image to be transferred onto the paper sheet. After the image forming is completed, in step S3, the color image forming apparatus 101 determines whether the next page exists. If it is determined in step S3 that no next page exists (NO in step S3), then the processing ends. If it is determined in step S3 that the next page exists (YES in step S3), then the color image forming apparatus 101 proceeds to step S4.

In step S4, the color image forming apparatus 101 compares an image magnification for the page onto which the image forming is completed, which is set via the image magnification setting field 823 in FIG. 8C, and an image magnification for the image to be formed next, which is set via the image magnification setting field 823 in FIG. 8C. If it is determined in step S4 that the image magnifications differ from each other as a result of the comparison (YES in step S4), the color image forming apparatus 101 proceeds to step S5. In step S5, the color image forming apparatus 101 changes the scanner motor speed for the next image, and then proceeds to step S6.

If it is determined in step S4 that the image magnifications match each other as a result of the comparison (NO in step S4), the color image forming apparatus 101 proceeds to step S6. In step S6, the color image forming apparatus 101 determines whether an image adjustment patch image is to be formed. If it is determined that an image adjustment patch image is to be formed (YES in step S6), the color image forming apparatus 101 proceeds to step S7.

In step S7, since, if the image magnifications for the page onto which the image is completely formed and the next page match each other, the scanner motor speed has not been changed, the color image forming apparatus 101 forms an image adjustment patch image after an interval equivalent to "C0+C1" illustrated in FIG. 10B to secure a toner scattering prevention area.

Since, if the image magnifications for the page onto which the image is completely formed and the next page differ from each other, the scanner motor speed has been changed, it is not required to secure a toner scattering prevention area. Thus, the color image forming apparatus 101 forms an image adjustment patch image immediately after completion of the speed change. Then, the color image forming apparatus 101 proceeds to step S1 again to form an image onto the next page.

As described above, in a case where changing of the scanner motor rotation speed and forming of a patch image are performed in the same paper interval in forming images onto a continuous plurality of pages, the color image forming apparatus 101 according to an embodiment first performs the changing of the scanner motor rotation speed. Thus, it is not required to provide a predetermined interval, which is essentially required to be provided to form a patch image in a paper trailing edge portion. Accordingly, an interval between pages can be shortened, and a decrease in productivity can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-136418 filed May 16, 2006 and No. 2007-084688 filed Mar. 28, 2007, which are hereby incorporated by reference herein in their entirety.

What is claimed is:

1. An image forming apparatus comprising:
   an image carrier;
   a scanning unit including a rotating polygonal mirror and configured to perform beam scanning using the rotating polygonal mirror to form an image on the image carrier;
   a control unit configured to change a rotation speed of the rotating polygonal mirror of the scanning unit to change a magnification of an image to be formed on the image carrier;
   a carrying member; and
   an adjustment unit configured to form a patch image in an area on the carrying member between a first area to which an image formed at a first scanning speed is transferred and a second area to which an image formed at a second scanning speed different from the first scanning speed is transferred and to perform an operation for adjusting an image to be formed on the image carrier based on a result of detection of the formed patch image,
   wherein the adjustment unit is configured to form the patch image after the control unit changes the rotation speed of the rotating polygonal mirror from the first scanning speed to the second scanning speed.

2. The image forming apparatus according to claim 1, wherein the carrying member includes an intermediate transfer unit configured to transfer thereto an image formed on the image carrier.

3. The image forming apparatus according to claim 1, wherein the carrying member includes a conveyance member configured to convey a recording material.

4. The image forming apparatus according to claim 1, wherein the adjustment unit is configured to form the patch image to adjust a density of an image to be formed on the image carrier.

5. The image forming apparatus according to claim 1, wherein the adjustment unit is configured to determine a density of the formed patch image and to adjust a density of an image to be formed on the image carrier based on the determined density of the formed patch image.

6. A method comprising:
   forming an image in a first area while a rotating polygonal mirror of a scanning unit is operated at a first scanning speed;
   changing a rotating speed of the rotating polygonal mirror of the scanning unit from the first scanning speed to a second scanning speed;
   forming a patch image in a second area after the rotation speed of the rotating polygonal mirror has changed from the first scanning speed to the second scanning speed; and
   forming an image in a third area while the rotating polygonal mirror of the scanning unit is operated at the second scanning speed, wherein the second area is located between the first area and the third area.

7. The method according to claim 6, further comprising:
   determining a density of the formed patch image; and
   adjusting a density of an image to be formed on an image carrier based on the determined density of the formed patch image.

8. An apparatus comprising:
   an image carrier;
   a scanning unit including a rotating polygonal mirror;
   a control unit configured to control a rotation speed of the rotating polygonal mirror of the scanning unit to control a magnification of an image to be formed on the image carrier; and
   an adjustment unit configured to form a patch image in an area on a carrying member between a first area to which an image formed at a first scanning speed is transferred and a second area to which an image formed at a second scanning speed different from the first scanning speed is transferred,
   wherein the patch image is formed after the control unit has changed the rotation speed of the rotating polygonal mirror from the first scanning speed to the second scanning speed.

9. The apparatus according to claim 8, wherein the adjustment unit is configured to determine a density of the formed patch image and to adjust a density of an image to be formed on the image carrier based on the determined density of the formed patch image.

10. The apparatus according to claim 8, wherein the carrying member includes an intermediate transfer unit configured to transfer thereto an image formed on the image carrier.

11. The apparatus according to claim 8, wherein the carrying member includes a conveyance member configured to convey a recording material.

12. The apparatus according to claim 8, wherein the scanning unit is configured to perform beam scanning using the rotating polygonal mirror to form an image on the image carrier.

* * * * *